US006065023A

United States Patent [19]

Yamazaki

[11] Patent Number: 6,065,023

[45] Date of Patent: May 16, 2000

[54] SPREAD SHEET READING-OUT/COLLATING APPARATUS, SPREAD SHEET READING-OUT/COLLATING METHOD, AND A COMPUTER-READABLE RECORDING MEDIUM WITH PROGRAM MAKING COMPUTER EXECUTE METHOD STORED THEREIN

[75] Inventor: Nobuhide Yamazaki, Kanagawa, Japan

[73] Assignee: Justsytem Corporation, Tokushima, Japan

[21] Appl. No.: 09/014,571

[22] Filed: Jan. 28, 1998

[30] Foreign Application Priority Data

May 8, 1997 [JP] Japan .................................... 9-118521

[51] Int. Cl.[7] ................................ G06F 5/00; G10L 9/00

[52] U.S. Cl. .......................... 707/503; 704/260; 704/270; 707/504

[58] Field of Search .................................... 707/503, 504; 704/260, 270

[56] References Cited

U.S. PATENT DOCUMENTS

| | | | |
|---|---|---|---|
| 5,280,575 | 1/1994 | Young et al. | 707/504 |
| 5,371,675 | 12/1994 | Greif et al. | 707/503 |
| 5,396,621 | 3/1995 | MacGregor et al. | 345/347 |
| 5,715,370 | 2/1998 | Luther et al. | 704/275 |
| 5,729,659 | 3/1998 | Potter | 704/270 |

OTHER PUBLICATIONS

Townsend, Carl et al. Microsoft Office 6 in 1, pp. 279–282, Jan. 1994.

*Primary Examiner*—David R. Hudspeth
*Assistant Examiner*—Abul K. Azad
*Attorney, Agent, or Firm*—Sughrue, Mion, Zinn, Macpeak & Seas, PLLC

[57] ABSTRACT

A spread sheet reading-out/collating apparatus, in which a spread sheet preparation module obtains a range to be read out from a position of a header cell specified by a read-out object specifying module using a read-out range determining module and outputs cell data within the range to be read out as well as the display format to a voice-generating data generation module, a voice-generating data generation module generates voice-generating data for a text comprising a Chinese and a Japanese characters mixed therein, and a voice synthesis module outputs voices based on the voice-generating data.

20 Claims, 34 Drawing Sheets

FIG.6A

| | A | B | C | D | E |
|---|---|---|---|---|---|
| 1 | | | | | |
| 2 | | 100 | 30 | 1000 | |
| 3 | | 111 | 500 | 1100 | |
| 4 | | 123 | 320 | | |
| 5 | | 125 | 210 | | |
| 6 | | | 120 | 2000 | |
| 7 | | | | | |

FIG.6B

| | A | B | C | D | E |
|---|---|---|---|---|---|
| 1 | | | | | |
| 2 | | 100 | 30 | 1000 | |
| 3 | | 111 | 500 | 1100 | |
| 4 | | 123 | 320 | | |
| 5 | | 125 | 210 | | |
| 6 | | | 120 | 2000 | |
| 7 | | | | | |

FIG.10A

| | A | B | C | D | E |
|---|---|---|---|---|---|
| 1 | | | | | |
| 2 | | 100 | 30 | 1000 | |
| 3 | | 111 | 500 | 1100 | |
| 4 | | 123 | 320 | | |
| 5 | | 125 | 210 | | |
| 6 | | | 120 | 2000 | |
| 7 | | | | | |

FIG.10B

| | A | B | C | D | E |
|---|---|---|---|---|---|
| 1 | | | | | |
| 2 | | 100 | 30 | 1000 | |
| 3 | | 111 | 500 | 1100 | |
| 4 | | 123 | 320 | | |
| 5 | | 125 | 210 | | |
| 6 | | | 120 | 2000 | |
| 7 | | | | | |

FIG.15A

| | A | B | C | D | E |
|---|---|---|---|---|---|
| 1 | | | | | |
| 2 | | | 30 | 1000 | |
| 3 | | 111 | 500 | 1100 | |
| 4 | | 123 | 320 | | |
| 5 | | 125 | 210 | | |
| 6 | | | 120 | 2000 | |
| 7 | | | | | |

FIG.15B

| | A | B | C | D | E |
|---|---|---|---|---|---|
| 1 | | | | | |
| 2 | | | 30 | 1000 | |
| 3 | | 111 | 500 | 1100 | |
| 4 | | 123 | 320 | | |
| 5 | | 125 | 210 | | |
| 6 | | | 120 | 2000 | |
| 7 | | | | | |

FIG.19A

| | A | B | C | D | E |
|---|---|---|---|---|---|
| 1 | | | | | |
| 2 | | | 30 | 1000 | |
| 3 | | 111 | 500 | 1100 | |
| 4 | | 123 | 320 | | |
| 5 | | 125 | 210 | | |
| 6 | | | 120 | 2000 | |
| 7 | | | | | |

FIG.19B

| | A | B | C | D | E |
|---|---|---|---|---|---|
| 1 | | | | | |
| 2 | | | 30 | 1000 | |
| 3 | | 111 | 500 | 1100 | |
| 4 | | 123 | 320 | | |
| 5 | | 125 | 210 | | |
| 6 | | | 120 | 2000 | |
| 7 | | | | | |

FIG.21A

| | A | B | C | D | E |
|---|---|---|---|---|---|
| 1 | | | | | |
| 2 | | | 30 | 1000 | |
| 3 | | 111 | 500 | 1100 | |
| 4 | | 123 | 320 | | |
| 5 | | 125 | 210 | | |
| 6 | | | 120 | 2000 | |
| 7 | | | | | |

FIG.21B

| | A | B | C | D | E |
|---|---|---|---|---|---|
| 1 | | | | | |
| 2 | | | 30 | 1000 | |
| 3 | | 111 | 500 | 1100 | |
| 4 | | 123 | 320 | | |
| 5 | | 125 | 210 | | |
| 6 | | | 120 | 2000 | |
| 7 | | | | | |

| | A | B | C | D | E |
|---|---|---|---|---|---|
| 1 | | | | | |
| 2 | | 100 | 30 | 1000 | |
| 3 | | 111 | 500 | 1100 | |
| 4 | | 123 | 320 | | |
| 5 | | 125 | 210 | | |
| 6 | | | 120 | 2000 | |
| 7 | | | | | |

SPREAD SHEET READING-OUT/ COLLATING APPARATUS, SPREAD SHEET READING-OUT/COLLATING METHOD, AND A COMPUTER-READABLE RECORDING MEDIUM WITH PROGRAM MAKING COMPUTER EXECUTE METHOD STORED THEREIN

FIELD OF THE INVENTION

The present invention relates to a spread sheet reading-out/collating apparatus for phonetically reading out a spread sheet (generally described as a spreadsheet or a worksheet) obtained through processing such as spreadsheet computing or the like, a spread sheet reading-out/collating method, and a computer-readable recording medium with a program stored therein for making a computer execute the method.

BACKGROUND OF THE INVENTION

In association with a remarkable development in the field of computer software, it has become possible to prepare on a computer a spread sheet in which a plurality of cells are arrayed in row and column directions and to obtain a desired result of spreadsheet computing by giving data such as a computing expression or a numerical value to each cell constituting the spread sheet.

Also in recent years, it has become possible to realize a text voice synthesizing technology for reading out a text with voices on software, and by combining the software for synthesizing voices for a text with the software for spreadsheet computing described above, it is possible to read out a spread sheet on a computer for such applications as checking or correcting input data.

In recent years, the technology for reading out a spread sheet has been improved and especially a method of reading out a spread sheet has been proposed. FIG. 23 shows a spread sheet displayed on a display screen. This spread sheet has cells therein arrayed in row and column directions, and column numbers of A, B, C, D, E as an example are given to the row direction while row numbers of 1, 2, 3, . . . , 7 are given to the column direction. Inputted in a second row, a third row, a fourth row, a fifth row, and a sixth row is, each along the row direction, data such as 100 (B column), 30 (C column), 1000 (D column), 111 (B column), 500 (C column), 1100 (D column), 123 (B column), 320 (C column), 125 (B column), 210 (C column), 120 (C column), and 2000 (D column).

For example, in a case where the whole area with data inputted therein in the spread sheet is decided as an object to be read out, the region from B column to D column in the row direction and the region from the second row to the sixth row in the column direction is determined as the range to be read out, so that the range to be read out is specified with a frame surrounding all the cells indicated by the shaded area in FIG. 23.

However, in the technology for reading out a spread sheet according to the example based on the conventional technology, when the number of rows and columns in which data is inputted increases, even rows and columns which lie off the screen are also targeted as an object to be read out, so that a range to be read out has to be specified while the screen is being scrolled keeping the frame as it is, whereby the operations become complicated and additional time is required for executing the complicated operations.

SUMMARY OF THE INVENTION

It is an object of the present invention to obtain a spread sheet reading-out/collating apparatus which can reduce a work load on a user by simplifying operations to specify a range to be read out, a spread sheet reading-out/collating method, and a computer-readable recording medium with a program stored therein for making a computer execute the method.

With the present invention, a header cell to be read out in the spread sheet is set; within a range formed with cells to be read out following the header cell, for a main scanning direction along a preset direction to be read out, a range up to a cell beyond which all the subsequent cells in an auxiliary scanning direction crossing the main scanning direction are blank and, for the auxiliary scanning direction crossing the main scanning direction along the preset direction to be read out, a range up to a cell beyond which all the subsequent cells in the main scanning direction crossing the auxiliary scanning direction are blank are retrieved; and the range formed with the range in the main scanning direction and with the range in the auxiliary scanning direction is determined as a range to be read out, so that only the header cell to be read out may be specified without necessity of specifying the whole range to be read out, and with this feature operations to specify a range to be read out can be simplified, whereby it is possible to reduce a work load to a user.

With the present invention, when a spread sheet is to be read out along the row direction, a header cell to be read out is specified in the spread sheet; within a range formed with cells to be read out following the header cell, for the row direction, a range up to a cell beyond which all the subsequent cells in the column direction are blank and, for the column direction, a range up to a cell beyond which all the subsequent cells in the row direction are blank are retrieved; and the range formed with the range in the row direction and with the range in the column direction is determined as a range to be read out, so that only the header cell to be read out may be specified without necessity of specifying the whole range to be read out required when the range is to be read out along the row direction, and with this feature operations to specify a range to be read out can be simplified at the time of reading it out along the row direction, whereby it is possible to reduce a work load to a user.

With the present invention, when a spread sheet is to be read out along the column direction, a header cell to be read out is specified in the spread sheet; within a range formed with cells to be read out following the header cell, for the column direction, a range up to a cell beyond which all the subsequent cells in the row direction are blank and, for the row direction, a range up to a cell beyond which all the subsequent cells in the column direction are blank are retrieved; and the range formed with the range in the column direction and with the range in the row direction is determined as a range to be read out, so that only the header cell to be read out may be specified without necessity of specifying the whole range to be read out required when the range is to be read out along the column direction, and with this feature operations to specify a range to be read out can be simplified at the time of reading it out along the column direction, whereby it is possible to reduce a work load to a user.

With the present invention, cells are arrayed along the preset direction to be read and an object to be read out is specified in the spread sheet with an alignment of the header cell and with an alignment of the last cell having a space therebetween in a direction crossing the preset direction to be read out; within a range from the alignment of the header cell to the alignment of the last cell, for the preset direction to be read out, a range up to a cell beyond which all the subsequent cells arrayed in a direction crossing the direction to be read out are blank is retrieved; and the range formed with the range in the preset direction to be read out and with the range from the alignment of the header cell to the alignment of the last cell is determined as a range to be read out, so that only the alignment of the header cell and the alignment of the last cell each to be read out may be specified without necessity of specifying the whole range to be read out required when the range is to be read, and with this feature operations to specify a range to be read out can be simplified, whereby it is possible to reduce a work load to a user.

With the present invention, when a spread sheet is to be read out along the row direction, an object to be read out is specified in the spread sheet with a starting row as well as with an end row each to be read out; within a range from the starting row to the end row, for the row direction, a range up to a cell beyond which all the subsequent cells in the column direction are blank is retrieved; and the range formed with the range in the row direction and with the range from the starting row to the end row is determined as a range to be read out, so that only the starting row and the end row each to be read out may be specified without necessity of specifying the whole range to be read out required when the range is to be read along the row direction, and with this feature operations to specify a range to be read out can be simplified at the time of reading it out along the row direction, whereby it is possible to reduce a work load to a user.

With the present invention, when a spread sheet to be read out along the column direction, an object to be read out is specified in the spread sheet with a starting column as well as with an end column each to be read out; within a range from the starting column to the end column, for the column direction, a range up to a cell beyond which all the subsequent cells in the row direction are blank is retrieved; and the range formed with the range in the column direction and with the range from the starting column to the end column is determined as a range to be read out, so that only the starting column and the end column each to be read out may be specified without necessity of specifying the whole range to be read out required when the range is to be read along the column direction, and with this feature operations to specify a range to be read out can be simplified at the time of reading it out along the column direction, whereby it is possible to reduce a work load to a user.

With the present invention, when a spread sheet is to be read out in the row direction, only one or a plurality of rows each of which is targeted as an object to be read out are specified in the spread sheet; within a range of the specified row(s), for the row direction, a range up to a cell beyond which all the subsequent cells in the column direction are blank is retrieved; and the range formed with the range in the row direction and with the row(s) is determined as a range to be read out, so that only rows may be specified for a range to be read out required when the range is to be read out along the row direction, and with this feature operations to specify a range to be read out can be simplified at the time of reading it out along the row direction, whereby it is possible to reduce a work load to a user.

With the present invention, when a spread sheet is to be read out along the column direction, only one or a plurality of columns each of which is targeted as an object to be read out are specified in the spread sheet; within a range of the specified column(s), for the column direction, a range up to a cell beyond which all the subsequent cells in the row direction are blank is retrieved; and the range formed with the range in the column direction and with the column(s) is determined as a range to be read out, so that only columns may be specified for a range to be read out required when the range is to be read out along the column direction, and with this feature operations to specify a range to be read out can be simplified at the time of reading it out along the column direction, whereby it is possible to reduce a work load to a user.

With the present invention, the cells within the determined range to be read out are read out along the preset direction to be read out, whereby it is possible to realize a desired reading-out/collation only by specifying a range to be read out with simple operations.

With the present invention, a header cell to be read out is specified in the spread sheet; within a range formed with cells to be read out following the header cell, for a main scanning direction along a preset direction to be read out, a range up to a cell beyond which all the subsequent cells in an auxiliary scanning direction crossing the main scanning direction are blank and, for the auxiliary scanning direction crossing the main scanning direction along the preset direction to be read out, a range up to a cell beyond which all the subsequent cells in the main scanning direction crossing the auxiliary scanning direction are blank are retrieved; the range formed with the range in the main scanning direction and with the range in the auxiliary scanning direction is determined as a range to be read out; and the cells within the range to be read out are read out along the preset direction to be read out, so that only a header cell to be read out may be specified without necessity of specifying the whole range to be read out, whereby it is possible to realize collation of a desired range to be read out with simple operations.

With the present invention, cells are arrayed along the preset direction to be read and an object to be read out in the spread sheet is specified with an alignment of the header cell as well as with an alignment of the last cell having a space therebetween in a direction crossing the preset direction to be read out; within a range from the alignment of the header cell to the alignment of the last cell, for the preset direction to be read out, a range up to a cell beyond which all the subsequent cells arrayed in a direction crossing the direction to be read out are blank is retrieved; the range formed with the range in the preset direction to be read out and with the range from the alignment of the header cell to the alignment of the last cell is determined as a range to be read out; and the cells within the range to be read out are read out along the preset direction to be read out, so that only an alignment of a header cell and an alignment of a last cell each to be read out may be specified without necessity of specifying the whole range required when the range is read out, whereby it is possible to realize reading-out/collation of a desired range to be read out with simple operations.

With the present invention, a program for making a computer executed a method according to the present invention is stored therein, so that the program becomes machine-readable, whereby it is possible to realize the operations in the method by a computer.

Other objects and features of this invention will become clear from the following description with reference to the accompanying drawings.

BRIEF DESCRIPTION OF THE DRAWINGS

FIGS. 6A and 6B are views for explaining examples of determination of the range to be read out in the row direction according to Embodiment 1;

FIGS. 10A and 10B are views for explaining examples of determination of the range to be read out in the column direction according to Embodiment 1;

FIGS. 15A and 15B are views for explaining examples of determination of the range to be read out in the row direction according to Embodiment 2;

FIGS. 19A and 19B are views for explaining examples of determination of the range to be read out in the column direction according to Embodiment 2;

FIGS. 21A and 21B are views for explaining examples of determination of the range to be read out in the column direction according to Embodiment 3;

DESCRIPTION OF THE PREFERRED EMBODIMENTS

Detailed description is made hereinafter for preferred embodiments of the spread sheet reading-out/collating apparatus, spread sheet reading-out/collating method for the same, and computer-readable recording medium with a program stored therein for making a computer execute the method each according to the present invention.

Embodiment 1

Figure 1A:
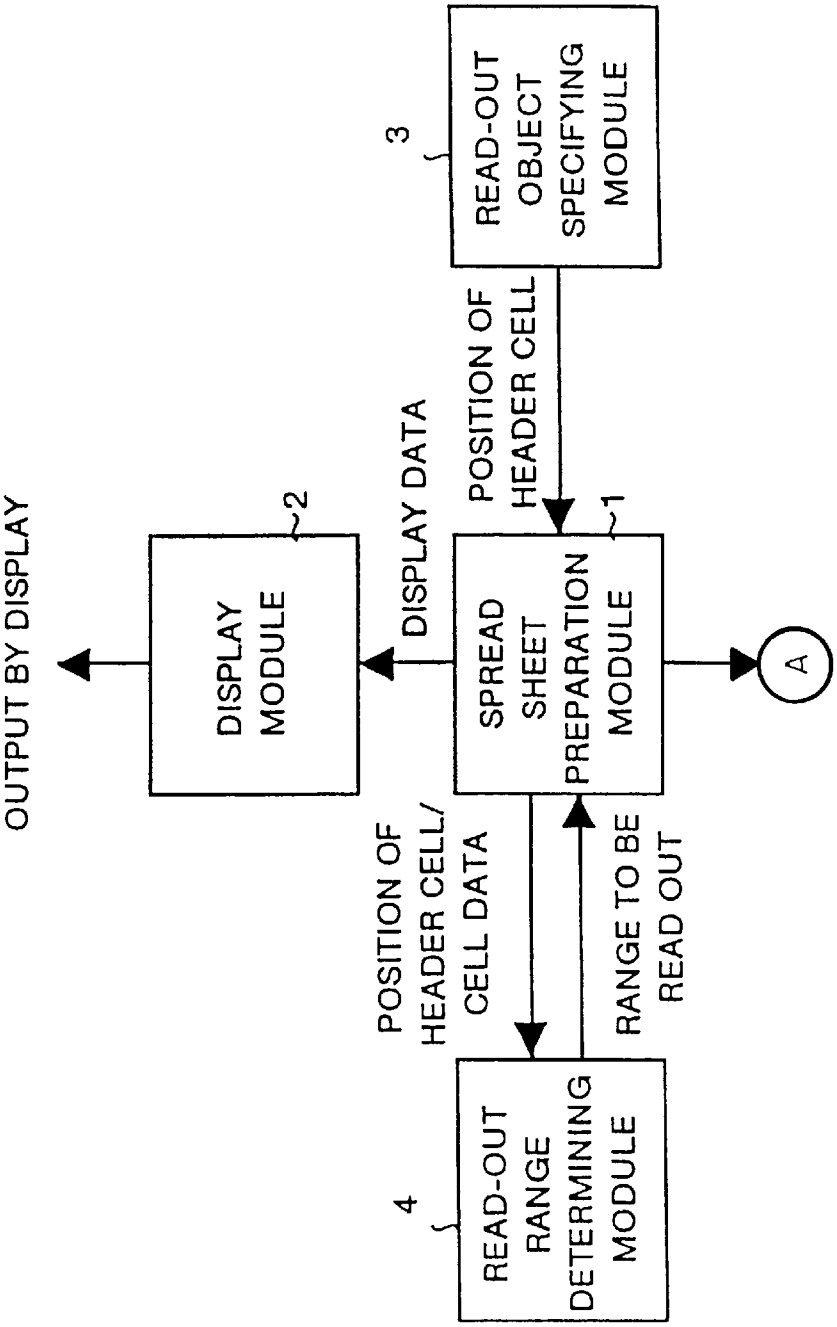
FIG. 1 is a functional block diagram for explaining internal functions of a spread sheet reading-out/collating apparatus according to Embodiment 1 of the present invention.
Figure 1B:
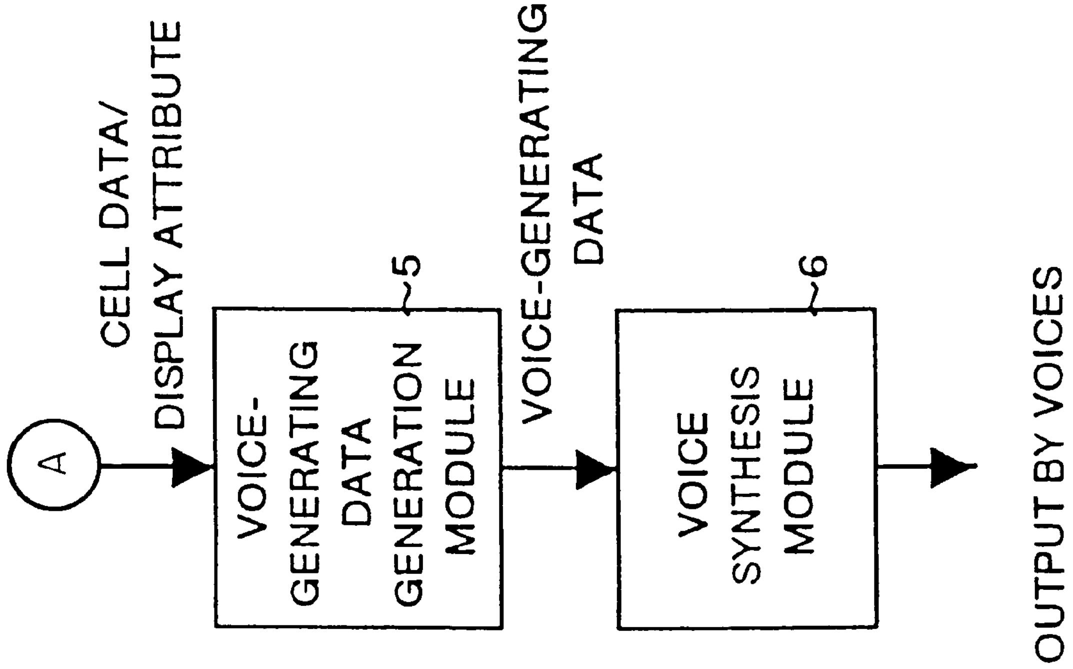

At first, description is made for module configuration according to Embodiment 1 of the present invention. FIG. 1 is a functional block diagram for explaining internal functions of a spread sheet reading-out/collating apparatus according to Embodiment 1 of the present invention. The module configuration shown in FIG. 1 comprises a spread sheet preparation module 1, a display module 2, a read-out object specifying module 3, a read-out range determining module 4, a voice-generating data generation module 5, and a voice synthesis module 6.

The spread sheet preparation module 1 prepares a spread sheet using known spreadsheet software and outputs cell data (indicating binary data) forming the prepared spread sheet to the voice-generating data generation module 5. The spread sheet preparation module 1 sets an attribute for specifying a display format of a character string such as words, dates, numerical values, or expressions to cell data such as item names and character information. When a spread sheet is to be read out, a display attribute for specifying the display format given to each cell is used as an attribute at the time of reading it out. For this reason, a method of supplying the display attribute and the cell data to the voice-generating data generation module 5 is employed.

The display module 2 receives display data corresponding to the display attribute of each cell from the spread sheet preparation module 1 and visually display the spread sheet based on the display data. The read-out object specifying module 3 specifies a header cell of an object to be read out (a range) in the spread sheet displayed by the display module 2 through a user interface, and gives positional information for the specified header cell to the spread sheet preparation module 1.

The read-out range determining module 4 receives the positional information for the header cell specified by the read-out object specifying module 3 from the spread sheet preparation module 1, retrieves cell data from the position of the header cell in the preset direction to be read out (a row direction, a column direction or the like), and determines a range to be read out according to whether any blank cell is present therein or not. The read-out range determining module 4 sends the result of determination of the range to be read out to the spread sheet preparation module 1. It should be noted that a preset direction to be read out indicates a main scanning direction, and a direction crossing the main scanning direction indicates an auxiliary scanning direction.

The voice-generating data generation module 5 generates voice-generating data comprising a text containing Chinese and Japanese characters mixed therein according to the display format of the item names, words, dates, numerical values, or expressions each based on the display attributes in the cell data for the spread sheet prepared by the spread sheet preparation module 1.

The voice synthesis module 6 synthesizes voices based on the voice-generating data comprising a text containing Chinese and Japanese characters mixed therein inputted from the voice-generating data generation module 5 and outputs voices obtained by the voice synthesis. Namely, the voice synthesis module 6 reads out the spread sheet by phonetically outputting it based on the voice-generating data (item names, words, dates, numerical values, and expressions or the like) generated according to the display attributes in the voice-generating data generation module 5.

With the functional block having the configuration as described above, the spread sheet preparation module 1 prepares a spread sheet by correlating cell data indicating words, dates, numerical values, and expressions or the like each allocated to each cell to the display format thereof or the like through the user interface while the user is supported by display of the display module 2. Then if an instruction to read out through the read-out object specifying module 3 is issued, the spread sheet preparation module 1 obtains a range to be read out from a position of the header cell specified by the read-out object specifying module 3 using the read-out range determining module 4, and outputs the cell data within the range to be read out as well as the display format to the voice-generating data generation module 5.

The voice-generating data generation module 5 generates voice-generating data based on a display format for indicating words, dates, numerical values, and expressions or the like from each cell data according to the preset direction to be read, and outputs the voice-generating data to the voice synthesis module 6. When the voice-generating data is generated, the display format (words, dates, numerical values, or expressions or the like) specified by the display attributes is used as information for specifying the way to read out the cell data as it is, so that it is not required to set a particular attribute. Accordingly, the voice-generating data generation module 5 generates voice-generating data for each cell according to the display format of the cell data specified by the display attributes namely the way to read it out.

As described above, when voice-generating data is generated by the voice-generating data generation module 5, the voice-generating data is outputted to the voice synthesis module 6 by being converted to a text containing Chinese and Japanese characters mixed therein, and the voice synthesis module 6 outputs voices obtained by the voice-generating data based on the display format specified by the display attribute namely the way of reading it out specified by the display attribute.

Figure 2:
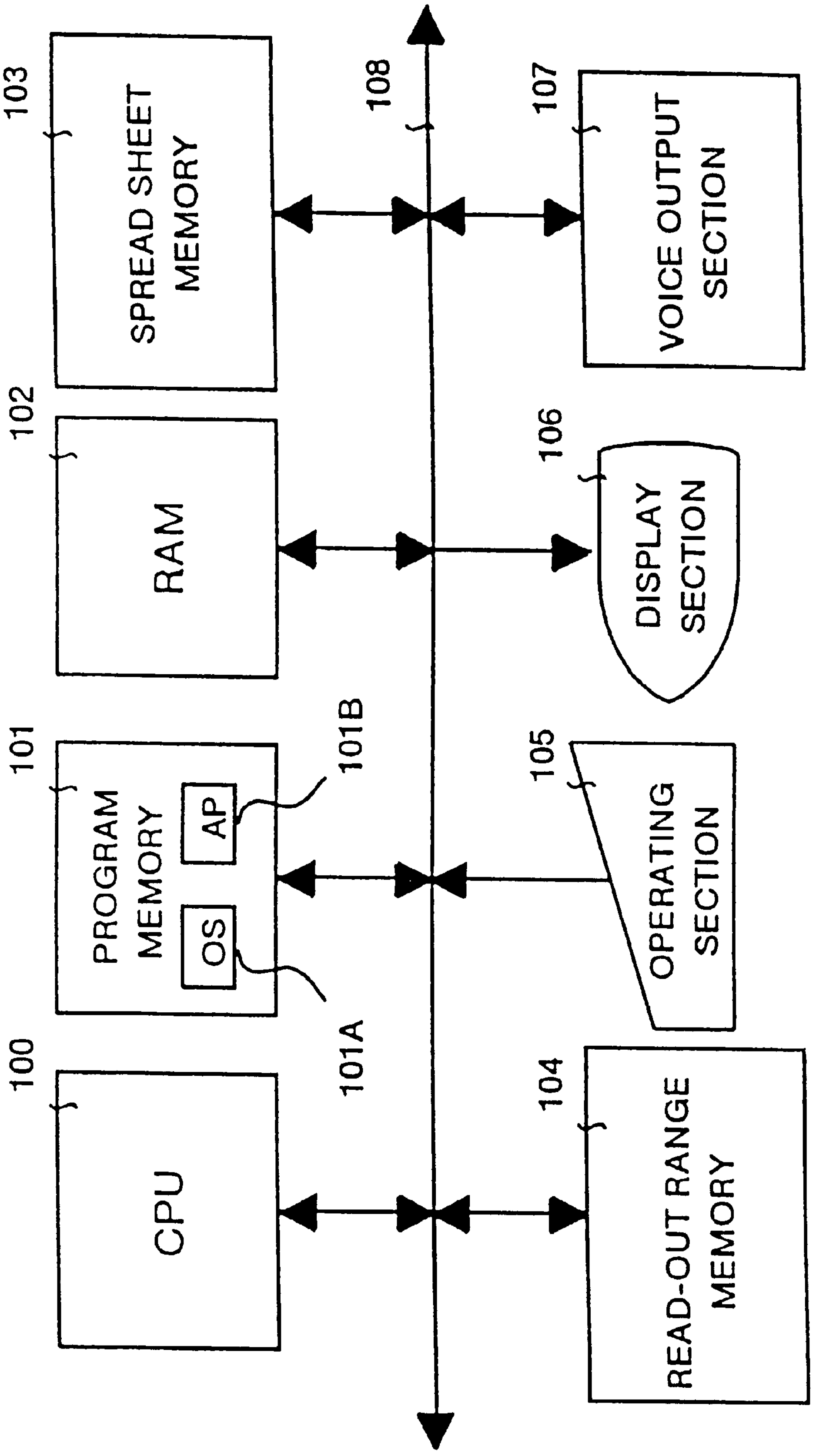
FIG. 2 is a block diagram showing internal configuration of the spread sheet reading-out/collating apparatus according to Embodiment 1.

In the next, description is made for configuration of the apparatus. FIG. 2 is a block diagram showing internal configuration of the spread sheet reading-out/collating apparatus according to Embodiment 1. The spread sheet reading-out/collating apparatus according to Embodiment 1 comprises, as shown in FIG. 2, units such as a CPU 100, a program memory 101 connected to an internal bus 108 connecting to the CPU 100, a RAM 102, a spread sheet memory 103, a read-out range memory 104, an operating section 105, a display section 106, a voice output section 107. It should be noted that the internal bus 108 is a transmission line for transmitting control signals, data, and address signals or the like.

The CPU 100 is a unit for controlling operations of the entire apparatus according to various types of programs stored in the program memory 101. Namely, the CPU 100 controls operations such as execution of the various types of programs stored in the program memory 101, read/write of data from/in the RAM 102, read/write of a spread sheet (cell data or display format) from/in the spread sheet memory 103, reception of key-entry from the operating section 105, display on the display section 106, and voice output to the voice output section 107.

The program memory 101 stores an operating system OS 101A, application programs AP 101B, and various parameters required for operations of the CPU 100. Included in the application program AP 101B are programs for realizing functions of the spread sheet preparation module 1, display module 2, readout object specifying module 3, read-out range determining module 4, voice-generating data generation module 5, and voice synthesis module 6. The RAM 102 is used as a work area at the time of execution of the CPU 100.

The spread sheet memory 103 is a memory for storing a spread sheet (cell data and the display format thereof) prepared by the spread sheet preparation module 1. The read-out range memory 104 stores information for the range to be read out determined by the read-out range determining module 4. The operating section 105 is a unit as a user interface and provides keys and switches for instructing operations such as preparation of a spread sheet, specification of an object to be read out, and voice output each through key-entry. The display section 106 displays a spread sheet prepared by the spread sheet preparation module 1 according to the control by the CPU 100 also executing operations of the display module 2.

The voice output section 107 is a unit comprising an amplifier and a speaker or the like for outputting voice according to the control by the CPU 100. In this voice output section 107, a spread sheet voice-synthesized by the voice synthesis module 6 is read out with voices.

Figure 3:
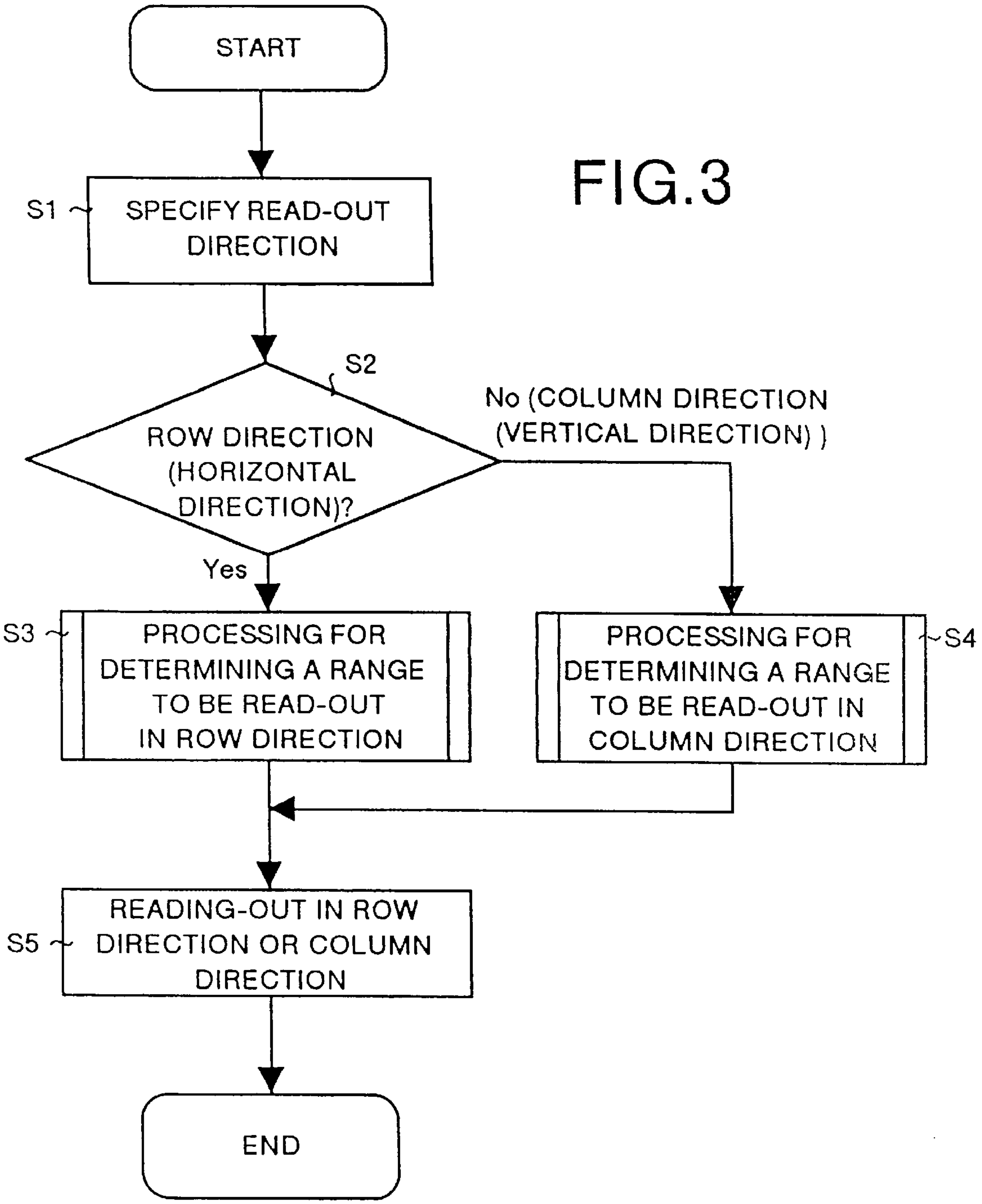
FIG. 3 is a flow chart for explaining the operations according to Embodiment 1.

In the next, description is made for operations. Although the operations described below are executed according to the control by the CPU 100, it is assumed that each operation is executed by each unit described above. At first description is made for the main operation. FIG. 3 is a flow chart for explaining operations according to Embodiment 1. In a case where reading out/collating of a spread sheet is to be started, at first it is necessary to set a direction to read it out at the time of reading it out for each cell. Therefore, a row direction or a column direction is specified by the operating section 105 (step S1).

As a result, in a case where a row direction (horizontal direction in a spread sheet) has been specified (step S2), the processing shifts to step S3, and processing for determining a range to be read out in the row direction is executed, on the other hand if a column direction (vertical direction in a spread sheet) has been specified (step S2), the processing shifts to step S4, and processing for determining a range to be read out in the column direction is executed. When the range to be read out either in the row direction or in the column direction has been determined, the processing shifts to step S5, then reading-out in the row direction is executed if it is a row direction while reading-out in the column direction is executed if it is a column direction. Then the main processing ends.

Figure 4:
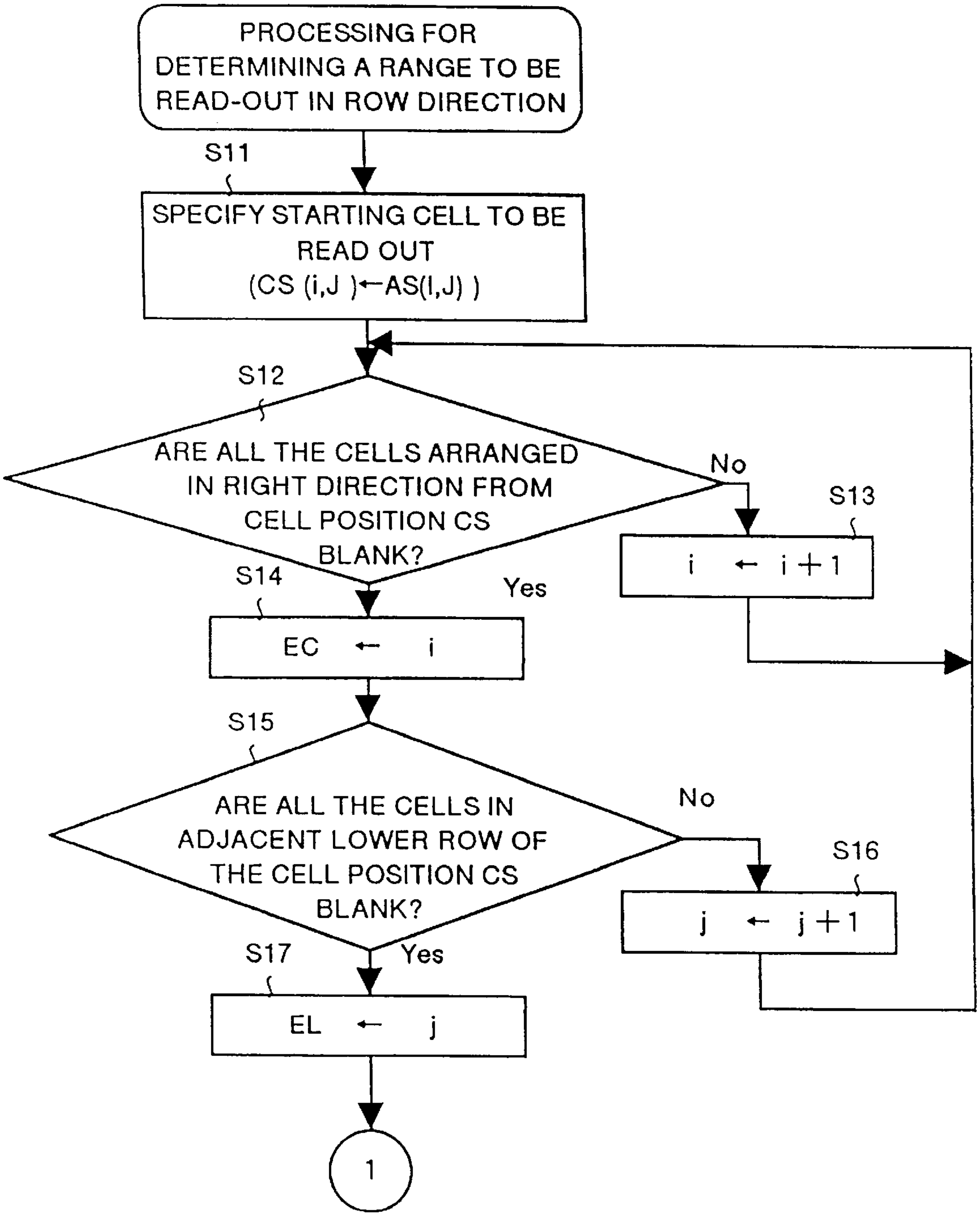
FIG. 4 is a flow chart for explaining the processing for determining a range to be read out in the row direction according to Embodiment 1.
Figure 5A:
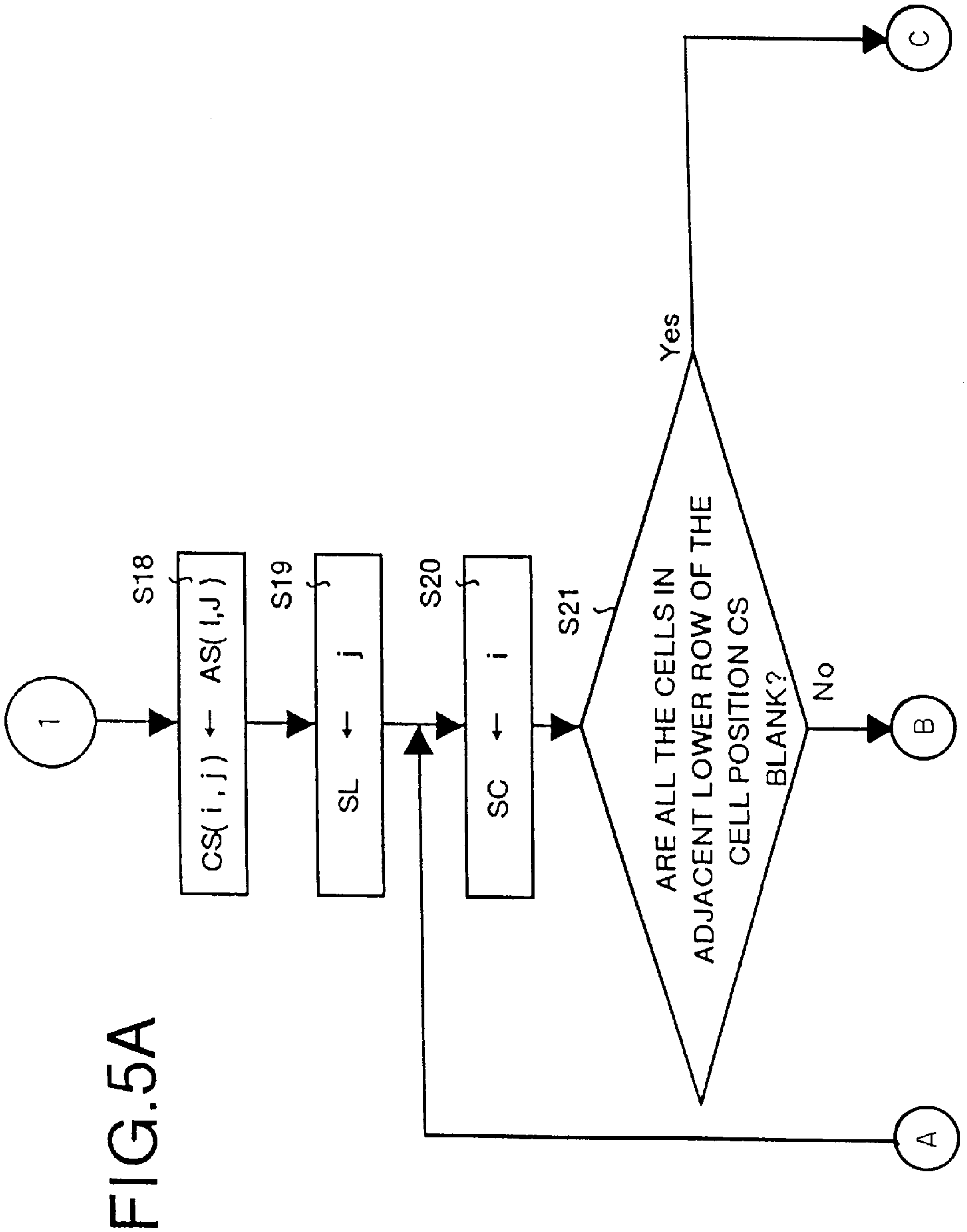
FIG. 5 is a flow chart for explaining the processing for determining a range to be read out in the row direction according to Embodiment 1.
Figure 5B:
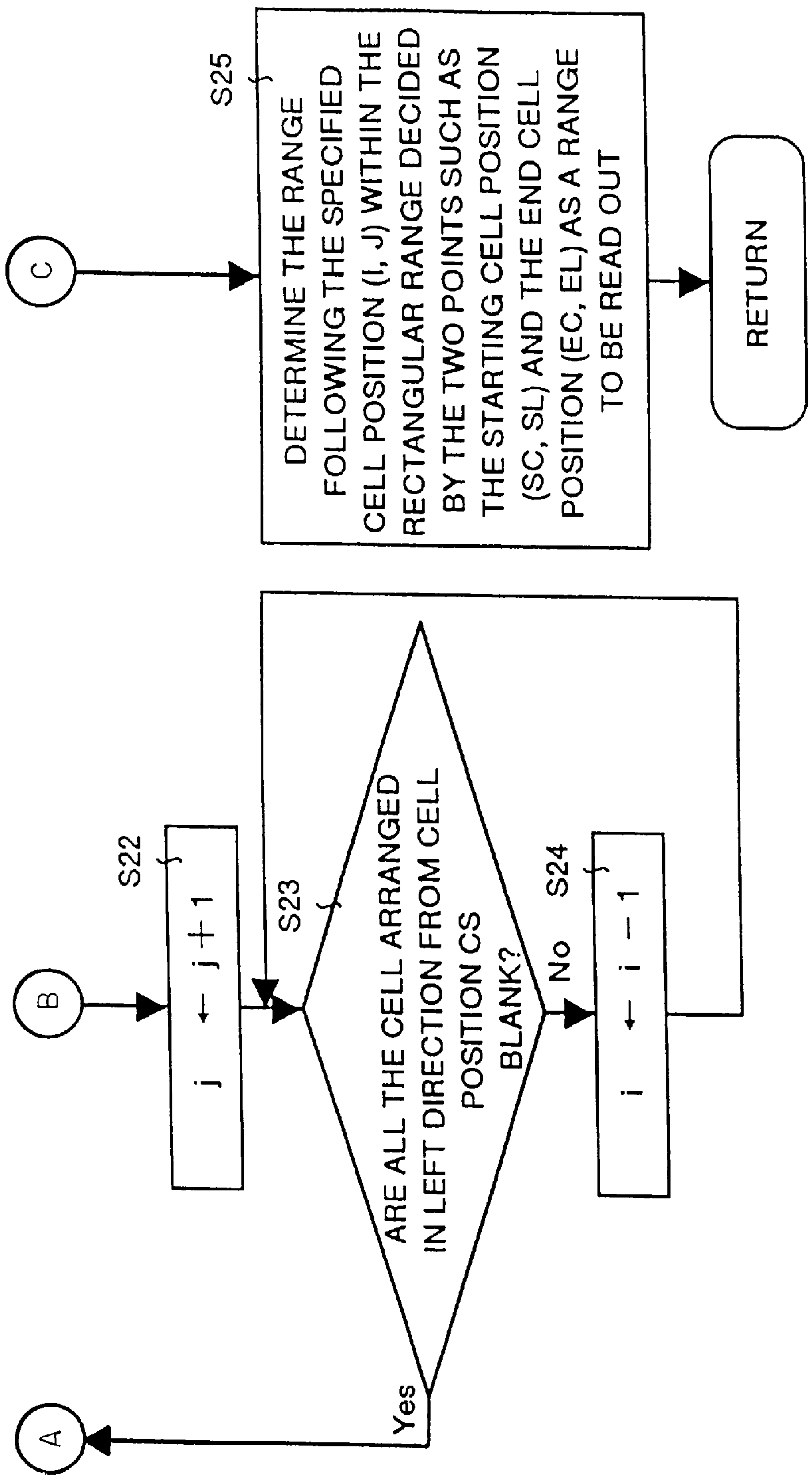
Figure 7:
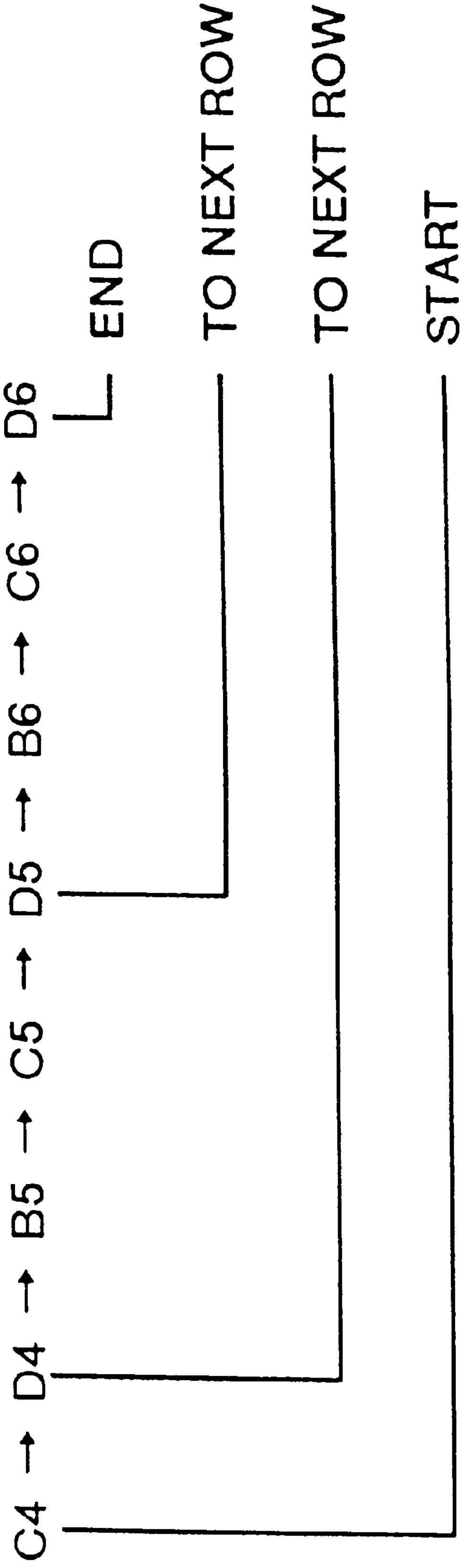
FIG. 7 is a view for explaining an example of the order of reading out the range to be read out in the row direction according to Embodiment 1.

In the next description is made for determination of a range to be read out assuming that the direction to be read out is a row direction. FIG. 4 and FIG. 5 are flow charts for explaining determination processing of a range to be read out in the row direction according to Embodiment 1, FIGS. 6A and 6B are views for explaining examples of determination of a range to be read out in the row direction according to Embodiment 1, and FIG. 7 is a view for explaining an example of the order of reading out the range to be read out in the row direction according to Embodiment 1.

In the processing, at first, a required header cell is specified as a starting cell to be read out by the operation through the operating section 105. In this specification, an operation of clicking a mouse required when a header cell is specified in an ordinary spreadsheet computing processing may be applied. Herein, it is assumed that addresses in the column direction on the spread sheet are 1, 2, 3 . . . , addresses in the row direction thereon are A, B, C . . . , and a position of the header cell is AS (I, J).

If FIG. 6A is taken up as an example of the header cell, the address in the row direction is "C" and the address in the column direction is "4" (the cell position indicated by the shaded area in the figure), so that the position of the header cell is expressed by AS (C, 4). Assuming the current cell position is CS (i, j), the address (C, 4) of the header cell position AS is given to the address (i, j) of the current cell position CS (step S11). Namely the current cell position CS is updated to (C, 4). Description is continued according to the example in FIGS. 6A and 6B thereafter.

At first an end row and an end column in the range to be read out are obtained. Because the direction to be read out is a row direction (horizontal direction), in the same row (the fourth row) as that where the current cell position CS is present, data (cell data) for each cell arranged in the rightward direction from the current cell position CS (C, 4) is retrieved, and determination is made as to whether all the cells therein are blank (cells in which data is not inputted) or not (step S12). If there is found even one cell with data inputted therein in the cells, it does not mean that all the cells are blank, so that the processing shifts to step S13. In step S13, the parameter i in the row direction is incremented by one to move the current cell position CS to one cell in the right direction. Then, the processing returns again to step S12, and determination is made therein as to whether all the cells in the rightward direction thereof are blank or not.

On the other hand, if all the cells are blank as shown in FIG. 6A, the processing shifts to step S14. In step S14, as the parameter i in the row direction of the current cell position CS namely the C column is the end column in the rightward direction in the row direction thereof, the parameter i in the row direction namely the column number "C" is set in a parameter EC indicating the end column. Further, in step S15, determination is made as to whether all the cells in the next lower row of the row where the current cell position CS is present namely in the fifth row are blank or not.

If there is found even one cell with data inputted therein in the cells, it does not mean that all the cells are blank, so that the processing shifts to step S16. In step S16, the current cell position CS is moved to the next lower row to execute the above processing for the next row. Namely, the parameter j in the column direction is incremented by one, and the row number is updated to "5". Then, the processing returns again to step S12, and the processing described above is repeatedly executed.

Also for the fifth row in the spread sheet, all the cells in the rightward direction from the current cell position CS (C, 5) are blank (refer to FIG. 6A), and not all the cells in the next lower row to the current row namely in the sixth row are blank, so that the parameter j in the column direction is incremented by one in step S16 to execute the processing from step S12, and the row number is updated to "6".

Then in the sixth row, determination has been made that not all the cells in the rightward direction from the current cell position CS (C, 6) are blank (refer to FIG. 6A), so that, in step S13, the parameter i in the row direction is incremented by one, and the column number is updated to "D". Then, it is found by the determination made again in step S12 that all the cells therein are blank, the processing shifts to step S14. In step S14, the parameter EC indicating the end column is updated, and the column number "C" is set in the parameter EC. Further, in step S15, determination is made as to whether all the cells in the next lower row of the row in which the current cell position CS is present, namely the seventh row are blank or not.

Because all the cells in the seventh row are blank, this time (step S15) the processing shifts to step S17. In the step S17, the parameter j in the column direction of the current cell position CS namely the sixth row is the end row in the downward direction of the column direction, so that the parameter j in the column direction namely the row number "6" is set in the parameter EL indicating the end row. As described above, in a case where the row direction is specified as a direction to be read out, if a row in which all the cells in the column direction (downward direction) are blank is found, a range in the rightward direction and that in the downward direction are decided at that stage.

Then, in step S18, the address (C, 4) of the header cell position AS is given again to the address (i, j) of the current cell position CS, and this time a starting row as well as a starting column in a range to be read out are obtained. It should be noted that the starting row therein indicates the row in which the header cell is present, so that the parameter j in the column direction namely the row number "4" is set in the parameter SL indicating the starting row as it is (step S19).

Further in step S20, the parameter i in the row direction of the current cell position CS namely the column number "C" is set in the parameter SC indicating the starting column, however, the parameter SC indicating the starting column in this stage is temporarily set. Then, determination is made as to whether all the cells in the next lower row to the row where the current cell position CS is present namely in the fifth row are blank or not (step S21).

In a case where it is determined in this step that all the cells are blank (step S21), only the row in which the specified header cell is present is an object to be read out, and because no cell arranged in the leftward direction from the header cell position is included in the range to be read out, the processing shifts to step S25 without the retrieval in the leftward direction.

On the other hand, if there is found even one cell with data inputted therein in the cells (step S21), it does not mean that all the cells are blank, so that the processing shifts to step S22. In step S22, the current cell position CS is moved to the next lower row to execute the above processing for the next row (fifth row). Namely, the parameter j in the column direction is incremented by one, and the row number is updated to "5".

Then, the processing shifts to step S23, and it is found, in the fifth row of the spread sheet, that cell data in the B column in the leftward direction from the current cell position CS (C, 5) is present (refer to FIG. 6A), then the processing shifts to step 24. In the step S24, the current cell position CS is moved to the B column in the processing thereafter, then the processing in the step S23 described above is repeatedly executed, so that the parameter i in the row direction is decremented by one and the column number is updated to "B".

In the determination made again in step S23, all the cells in the leftward direction from the current cell position CS (B, 5) are blank (refer to FIG. 6A), the processing returns again to step S20, and in the step S20, the parameter SC indicating the starting column is updated. As a result, the column number "B" is set in the parameter SC. Further in step S21, determination is made as to whether all the cells in the next lower row to the row where the current cell position is present are blank or not.

In the sixth row, as shown in FIG. 6A, it is determined that not all the cells are blank (step S21), so that the processing shifts to step S22, then the current cell position CS is moved to the next lower row. Namely the parameter j in the column direction is incremented by one and the row number is updated to "6". Then, it is found that all the cells in the leftward direction from the current cell position CS (B, 6) are blank (refer to FIG. 6A), then the processing returns again to step S20, and in step S20, the parameter SC indicating the starting column is updated, however, in this case, there is found no cell having any data therein in the leftward direction from the column number "B" set in the row (fifth row) one above the current row, so that the same column number "B" is set therein.

Then in step S21, determination is made as to whether all the cells in the next lower row to the row where the current cell position CS is present namely in the seventh row are blank or not, but all the cells in the seventh row are blank as described above (refer to FIG. 6A), so that the processing shifts to step S25. As for the range to be read out, the range in the upward direction and that in the leftward direction are decided at this stage.

In step S25, a rectangular range is set with two points such as the starting cell position (SC, SL) and the end cell position (EC, EL) from the parameters SL, SC, EL, and EC each indicating the starting row, starting column, end row, and end column respectively, and the range in the direction to be read out following the starting cell position (C, 4) is determined, within the rectangular range, as a range to be read out. Namely, the range to be read out is the range indicated by the shaded area in FIG. 6B, and the range may be shown to a user by being displayed in reverse video on the display or the like.

When the range to be read out is determined as described above, reading-out is executed in the main processing (refer to Step S5 in FIG. 3). Namely, the reading-out in the row direction is executed, as shown in FIG. 7, in the order of cells of C4 (indicating the cell position (C, 4)), D4, B5, C5, D5, B6, C6, and D6. It should be noted that the read-out range memory 104 stores therein the range to be read out, when the range to be read out has been determined, in the order of reading-out shown in FIG. 7.

Figure 8A:
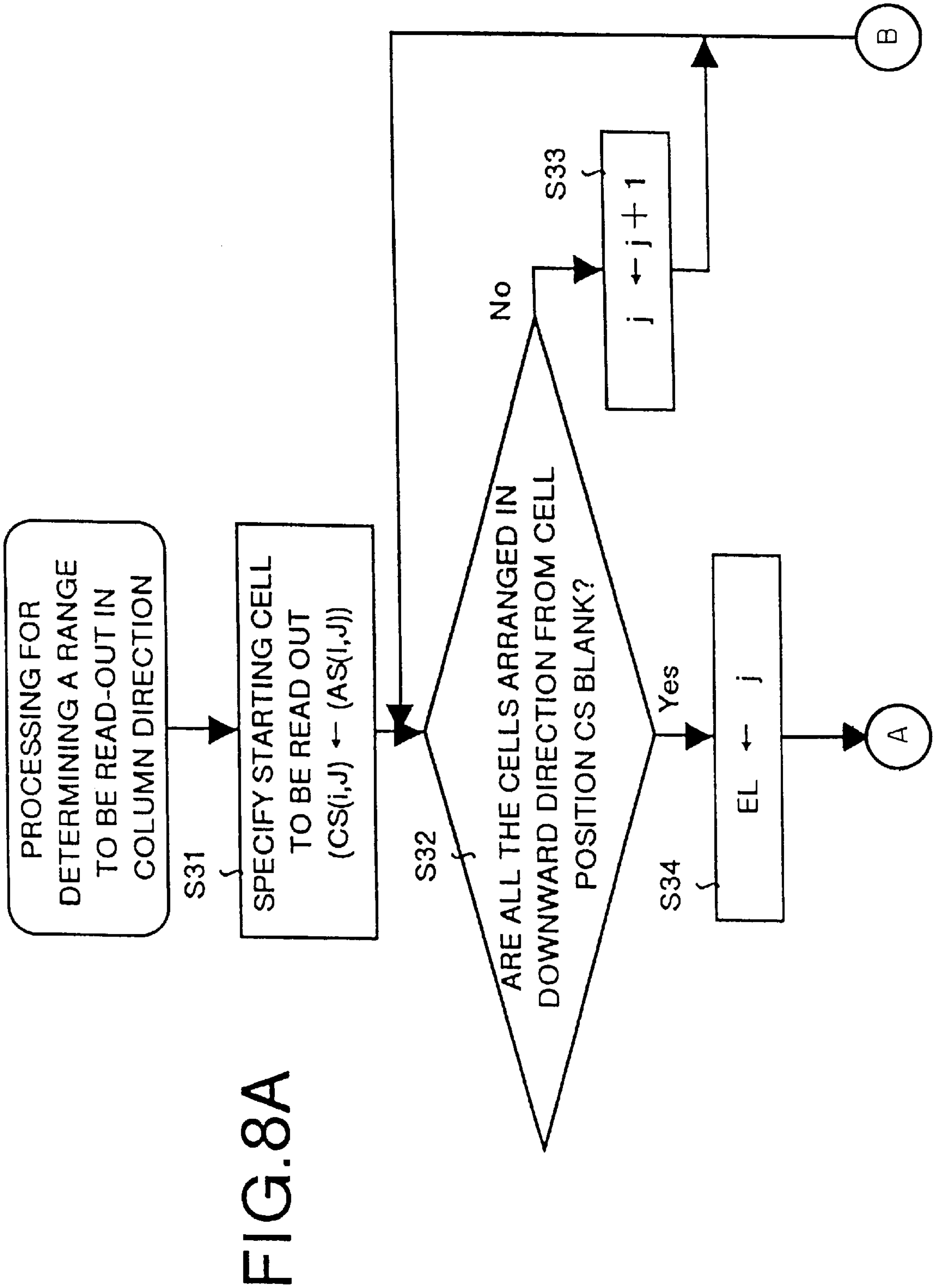
FIG. 8 is a flow chart for explaining the processing for determining a range to be read out in the column direction according to Embodiment 1.
Figure 8B:
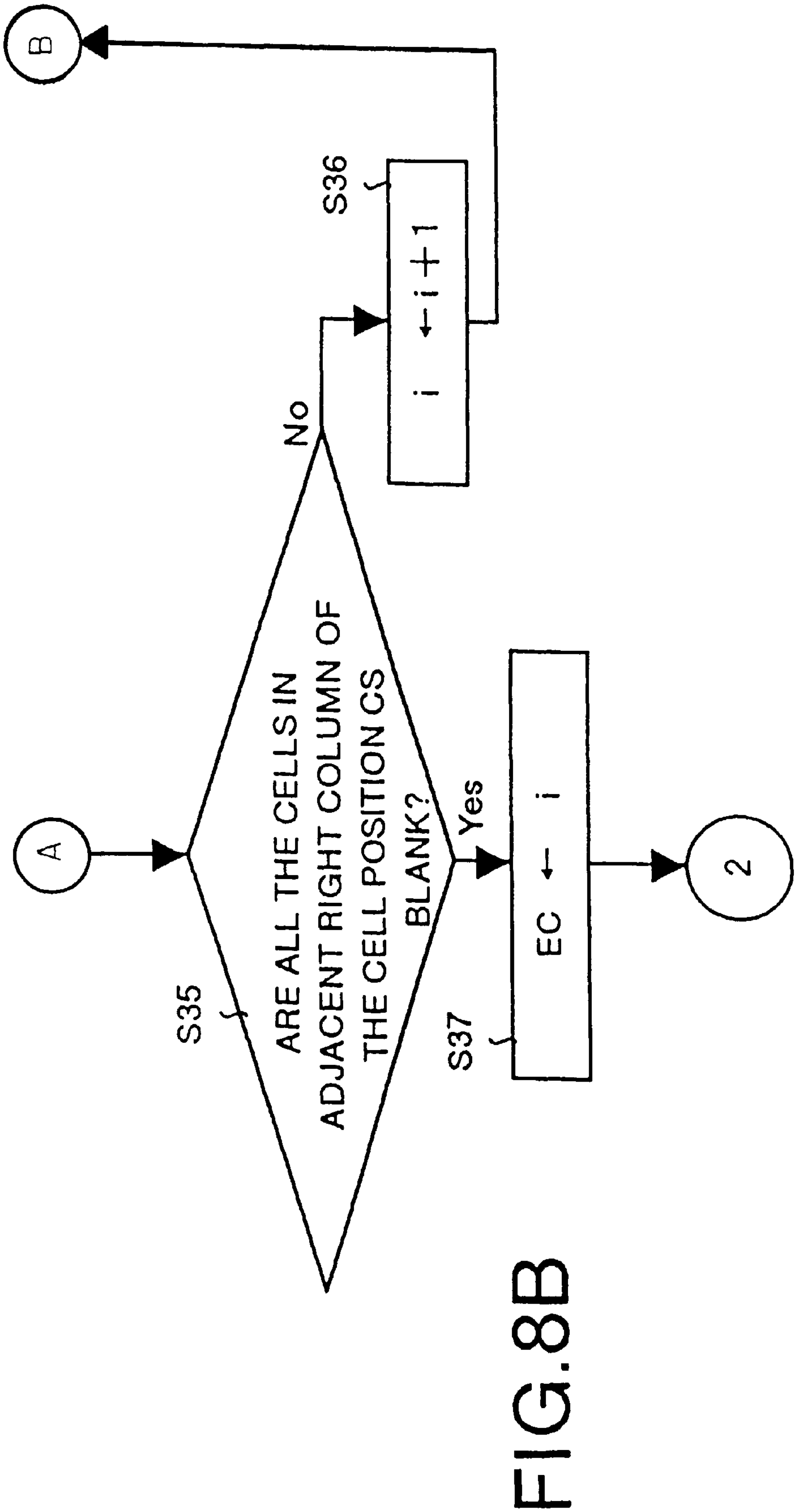
Figure 9A:
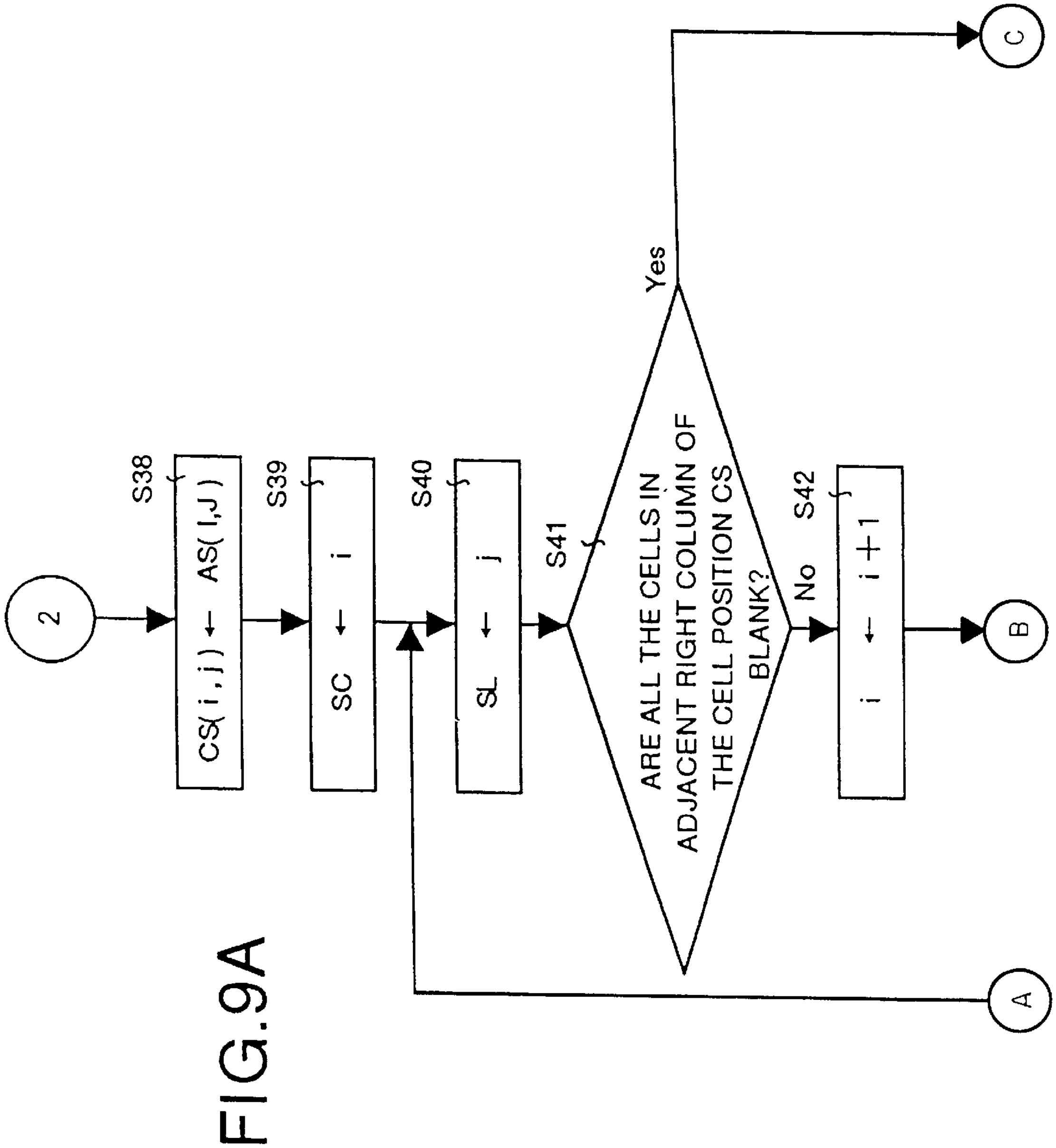
FIG. 9 is a flow chart for explaining the processing for determining a range to be read out in the column direction according to Embodiment 1.
Figure 9B:
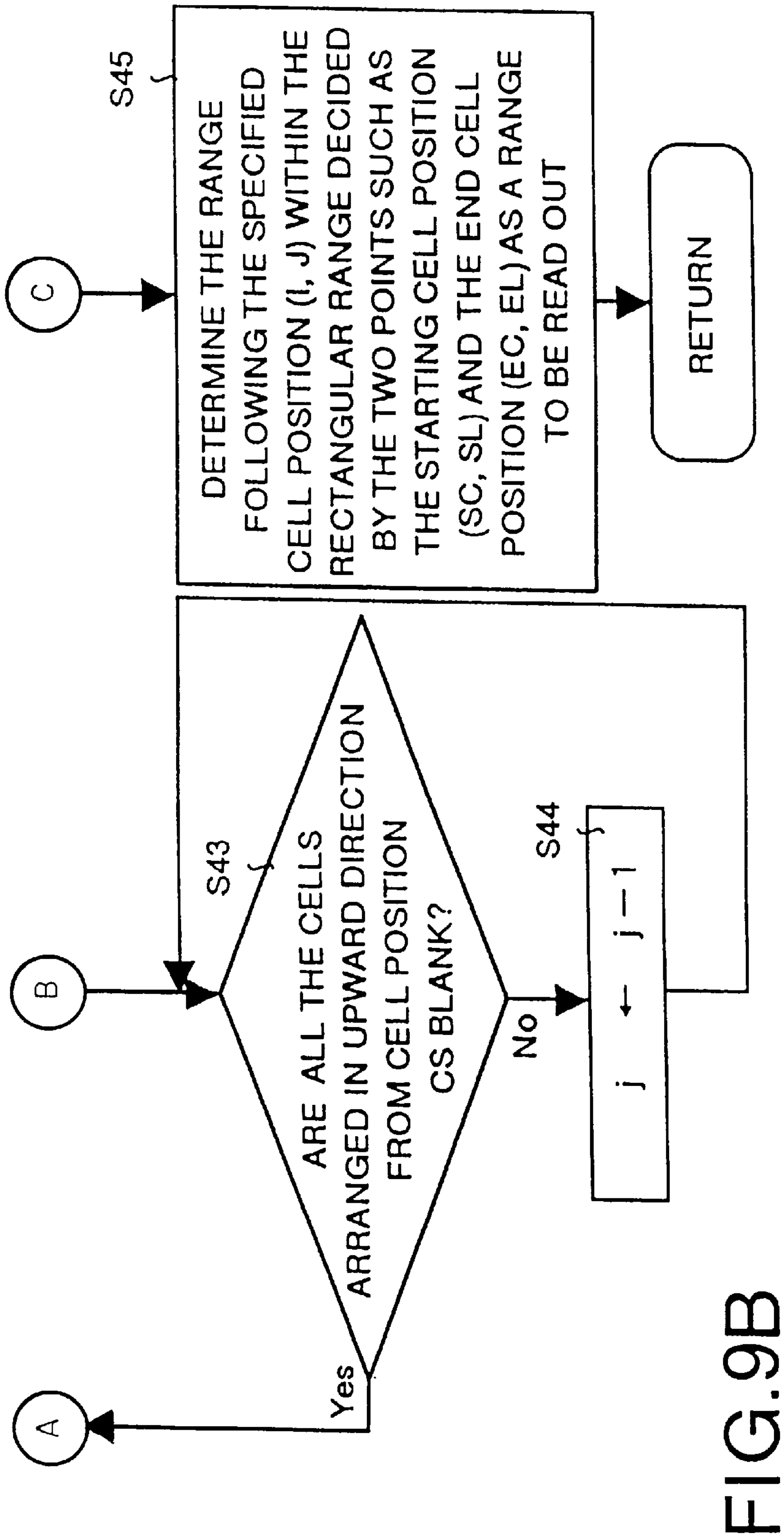
Figure 11:
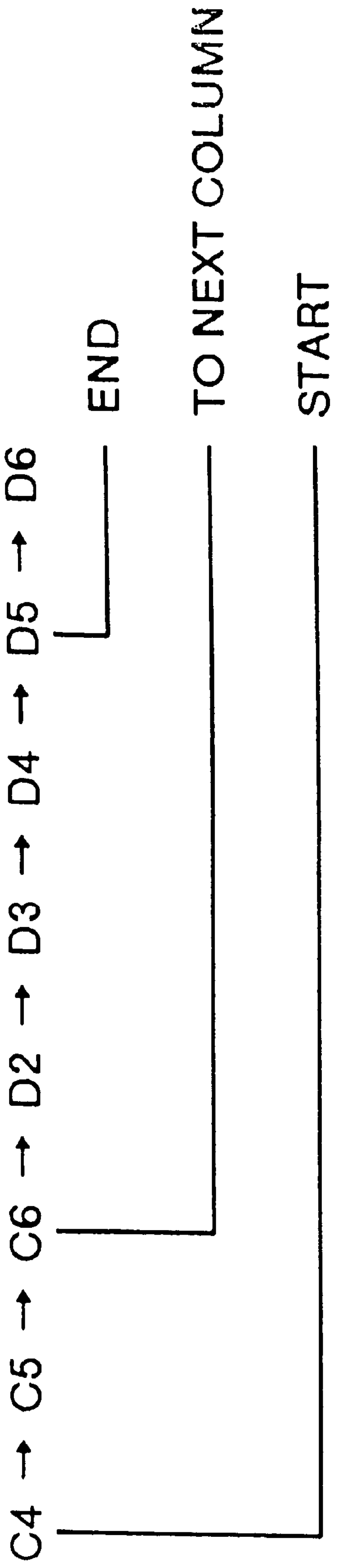
FIG. 11 is a view for explaining an example of the order of reading out the range to be read out in the column direction according to Embodiment 1.

Then, description is made for determination of a range to be read out in which the column direction is a direction to be read out. FIG. 8 and FIG. 9 are flow charts for explaining the processing for determining a range to be read out in the column direction according to Embodiment 1, FIGS. 10A and 10B are views for explaining an example of determining an range to be read out in the column direction according to Embodiment 1, and FIG. 11 is a view for explaining an example of the order of reading out a range to be read out in the column direction according to Embodiment 1.

The processing for the column direction is the same as that for the row direction as described above in the basic principles, so that simple description thereof is made hereinafter for the same. In the processing, at first, a required header cell is specified as a starting cell to be read out by the operation through the operating section 105. Herein, it is assumed that a position of the header cell is AS (C, 4) in the same spread sheet as described above as shown in FIG. 10A. Accordingly, the address of the current cell position CS is (i, j) according to the header cell position AS (C, 4) (step S31). Description is continued hereinafter according to the example in FIGS. 10A and 10B.

At first an end row and an end column in the range to be read out are obtained. Because the direction to be read out is a column direction (vertical direction), in the same column (the C column) as that where the current cell position CS is present, data (cell data) for each cell arranged in the downward direction from the current cell position CS (C, 4) is retrieved, and determination is made as to whether all the cells therein are blank (cells in which data is not inputted) or not (step S32). In FIG. 10A, as data is present in the fifth row in the same column, in step S33, the parameter j in the column direction is incremented by one to move the current cell position CS to the next lower row, and the row number is updated to "5". Then, the processing returns again to step S32, and it is determined therein that data is also present in the sixth row which is further lower from the above row, so that the parameter j in the column direction is incremented again in step S33, and the row number is updated to "6".

However, as all the cells in the seventh row and thereafter which is further lower from the above row are blank (step S32), the processing shifts to step S34. In step S34, as the parameter j in the column direction of the current cell position CS namely the sixth row is the end row in the downward direction in the column direction thereof, the parameter j in the column direction namely the row number "6" is set in the parameter EL indicating the end row. Further, in step S35, determination is made as to whether all the cells in the next column in the right to the column where the current cell position CS is present namely in the D column are blank or not.

In step S35, determination is made that not all the cells in the D column are blank (refer to FIG. 10A), then, in step S36, the parameter i in the row direction is incremented by one, and the column number is updated to "D". Then, when determination is made again in step S32 as to whether the lower cells are blank or not, it is found that all the cells lower from the sixth row where the current cell position CS is present are blank, the processing shifts to step S34. In step S34, the parameter EL indicating the end row is updated, but in this case, the row number "6" which is the same as that set in the C column is set therein. Further, in step S35, determination is made as to whether all the cells in the next column in the right to the column where the current cell position CS is present namely in the E column are blank or not.

Because all the cells in the E column are blank, this time (step S35), the processing shifts to step S37. In the step S37, the parameter i in the row direction of the current cell position CS namely the D column is the end column in the rightward direction of the row direction, so that the parameter i in the row direction namely the column number "D" is set in the parameter EC indicating the end column. As described above, in a case where the column direction is specified as a direction to be read out, if a column in which all the cells in the row direction (rightward direction) are blank is found, a range in the rightward direction and that in the downward direction are decided at that stage.

Then, in step S38, the address (C, 4) of the header cell position AS is given again to the address (i, j) of the current cell position CS, and this time a starting row as well as a starting column in a range to be read out are obtained. It should be noted that the starting column indicates the column in which the header cell is arranged, so that the parameter i in the row direction namely the column number "C" is set in the parameter SC indicating the starting column as it is (step S39).

Further in step S40, the parameter j in the column direction of the current cell position CS namely the row number "4" is set in the parameter SL indicating the starting row, however, the parameter SL indicating the starting row in this stage is temporarily set. Then, determination is made as to whether all the cells in the next column in the right to the column where the current cell position CS is present namely in the D column are blank or not (step S41).

In a case where it is determined in this step that all the cells therein are blank (step S41), only the column in which the specified header cell is present is an object to be read out, and because no cell arranged in the upward direction from the header cell position is included in the range to be read out, the processing shifts to step S45 without the retrieval in the upward direction.

On the other hand, if there is found even one cell with data inputted therein in the cells (step S41), it does not mean that all the cells are blank, so that the processing shifts to step S42. In step S42, the current cell position CS is moved to the next column in the right to execute the above processing for the next column (D column). Namely, the parameter i in the row direction is incremented by one, and the column number is updated to "D".

Then, the processing shifts to step S43, and it is found, in the D column of the spread sheet, that cell data in the third row in the upward direction from the current cell position CS (D, 4) is present (refer to FIG. 10A), then the processing shifts to step 44. In the step S44, the current cell position CS is moved to the fourth row in the processing thereafter, then the processing in the step S43 described above is repeatedly executed, so that the parameter j in the column direction is decremented by one and the row number is updated to "3".

In the determination made again in step S43, not all the cells in the upward direction from the current cell position CS (D, 3) are blank, so that the parameter j in the column direction in step S44 is again decremented by one, and the row number is updated to "2". Then, in the determination made again in step S43, all the cells in the upward direction from the current cell position CS (D, 2) are blank (refer to FIG. 10A), so that the processing returns again to step S40, and in the step S40, the parameter SL indicating the starting row is updated. As a result, the row number "2" is set in the parameter SL. Further in step S41, determination is made as to whether all the cells in the next column in the right to the column where the current cell position CS is present namely in the E column are blank or not.

Then in step S41, determination is made as to whether all the cells in the next column in the right to the column where the current cell position CS is present namely in the E column are blank or not, however, as described above, all the cells in the E column are blank (refer to FIG. 10A), so that the processing shifts to step S45. As for a range to be read out, the range in the upward direction and that in the leftward direction are decided at this stage.

In step S45, a rectangular range is set with two points such as the starting cell position (SC, SL) and the end cell position (EC, EL) from the parameters SL, SC, EL, and EC each indicating the starting row, starting column, end row, and end column respectively, and the range in the direction to be read out following the starting cell position (C, 4) is determined, within the rectangular range, as a range to be read out. Namely, the range to be read out is the range indicated by the shaded area in FIG. 10B, and the range may be highlighted on the display or the like.

When the range to be read out is determined as described above, reading-out is executed in the main processing (refer to Step S5 in FIG. 3). Namely, the reading-out in the column direction is executed, as shown in FIG. 11, in the order of cells of C4 (indicating the cell position (C, 4)), C5, C6, D2, D3, D4, D5, and D6. It should be noted that the read-out range memory 104 stores therein the range to be read out, when the range to be read out has been determined, in the order of reading-out shown in FIG. 11.

As described above, with Embodiment 1, when a spread sheet is to be read out along the row direction, a header cell to be read out is specified in the spread sheet; within a range formed with cells to be read out following the header cell, for the row direction, a range up to a cell beyond which all the subsequent cells in the column direction are blank and, for the column direction, a range up to a cell beyond which all the subsequent cells in the row direction are blank are retrieved; and the range formed with the range in the row direction and with the range in the column direction is determined as a range to be read out, so that only a header cell to be read out may be specified without necessity of specifying the whole range to be read out required when the range is to be read out along the row direction. With this feature, operations to specify a range to be read out can be simplified at the time of reading it out along the row direction, whereby it is possible to reduce a load on a user.

Also, when a spread sheet is to be read out along the column direction, a header cell to be read out is specified in the spread sheet; within a range formed with cells to be read out following the header cell, for the column direction, a range up to a cell beyond which all the subsequent cells in the row direction are blank and, for the row direction, a range up to a cell beyond which all the subsequent cells in the column direction are blank are retrieved; and the range formed with the range in the column direction and with the range in the row direction is determined as a range to be read out, so that only a header cell to be read out may be specified without necessity of specifying the whole range to be read out required when the range is to be read out along the column direction, and with this feature operations to specify a range to be read out can be simplified at the time of reading it out along the column direction, whereby it is possible to reduce a load on a user.

Also, cells within the determined range to be read out are read out along the preset direction to be read out, whereby it is possible to realize a desired reading-out/collation of the cells only by specifying a range to be read out with simple operations.

Embodiment 2

In Embodiment 1, only a starting cell to be read out is specified to determine a range to be read out, however, a row (rows) or a column (columns) may be specified as a unit like in Embodiment 2 described below. It should be noted that the hardware configuration herein is the same as that in Embodiment 1, so that the figures and description thereof are omitted herein, and description is made hereinafter only for functionally different sections.

Figure 12A:
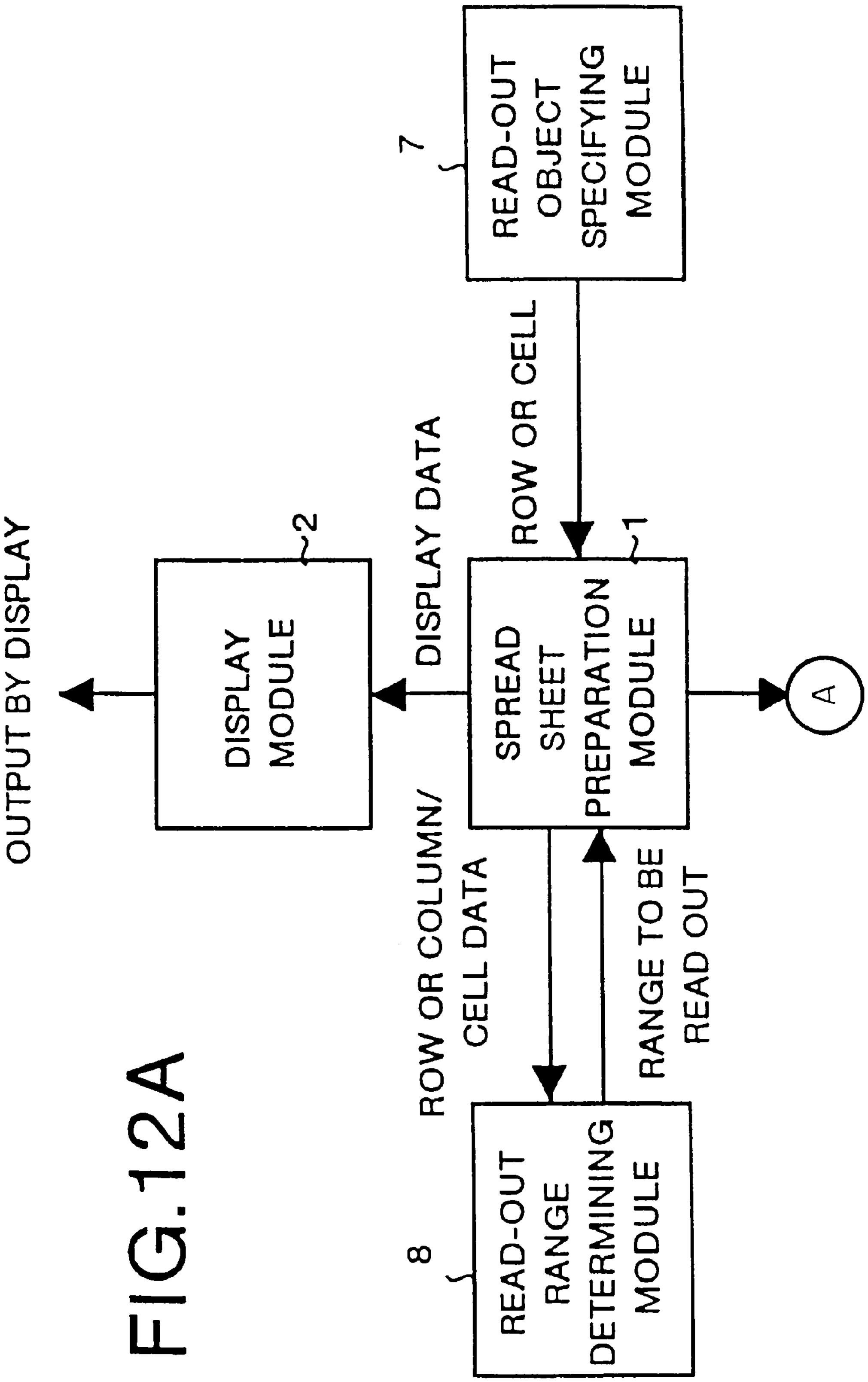
FIG. 12 is a functional block diagram for explaining an internal function of a spread sheet reading-out/collating apparatus according to Embodiment 2 of the present invention.
Figure 12B:
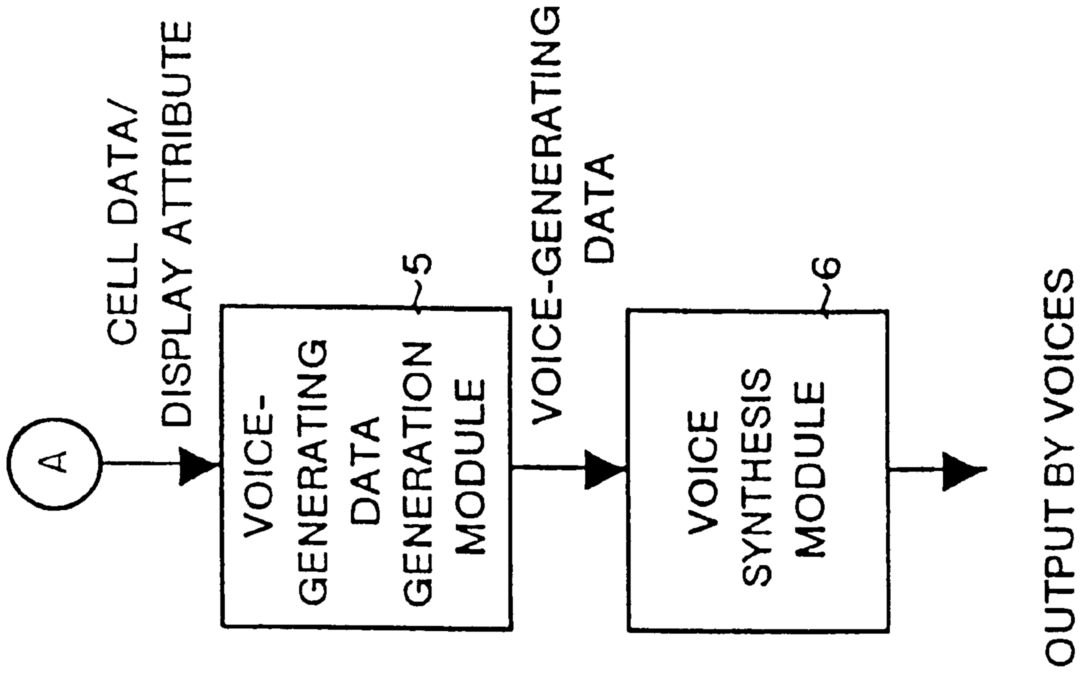

At first, description is made for an internal function therein. FIG. 12 is a functional block diagram for explaining an internal function of a spread sheet reading-out/collating apparatus according to Embodiment 2 of the present invention. The module configuration shown in FIG. 12 comprises the spread sheet preparation module 1, display module 2, voice-generating data generation module 5, voice synthesis module 6, read-out object specifying module 7, and read-out range determining module 8.

The read-out object specifying module 7 specifies one or a plurality of rows or columns in an object to be read out (a range) in a spread sheet displayed by the display module 2 through the user interface and gives information for the specified row or column to the spread sheet preparation module 1. The read-out range determining module 8 receives the information for the row or column specified by the read-out object specifying module 7 from the spread sheet preparation module 1, retrieves cell data for the row or the column given along a preset direction to be read out (a row direction, a column direction), and determines the range to be read out according to whether blank cells are present or not therein. The read-out range determining module 8 gives a response with the range to be read out as a result of determination to the spread sheet preparation module 1.

With the functional block having the configuration as described above, the spread sheet preparation module 1 prepares a spread sheet by correlating cell data indicating words, dates, numerical values, and expressions or the like each allocated to each cell to the display format thereof or the like through the user interface while the user is supported by display of the display module 2. Then, if an instruction to read out through the read-out object specifying module 7 is issued, the spread sheet preparation module 1 obtains a range to be read out from a row or a column specified by the read-out object specifying module 7 using the read-out range determining module 8, and outputs the cell data within the range to be read out as well as the display format to the voice-generating data generation module 5.

The voice-generating data generation module 5 generates voice-generating data based on a display format for indicating words, dates, numerical values, and expressions or the like from each cell data according to the preset direction to be read out, and outputs the voice-generating data to the voice synthesis module 6. When the voice-generating data is generated in the voice-generating data generation module 5, the voice-generating data is outputted in a text comprising Chinese and Japanese characters mixed therein to the voice synthesis module 6, and the voice synthesis module 6 outputs voices according to the voice-generating data based on the display format specified by the display attribute namely the way of reading it out.

Figure 13:
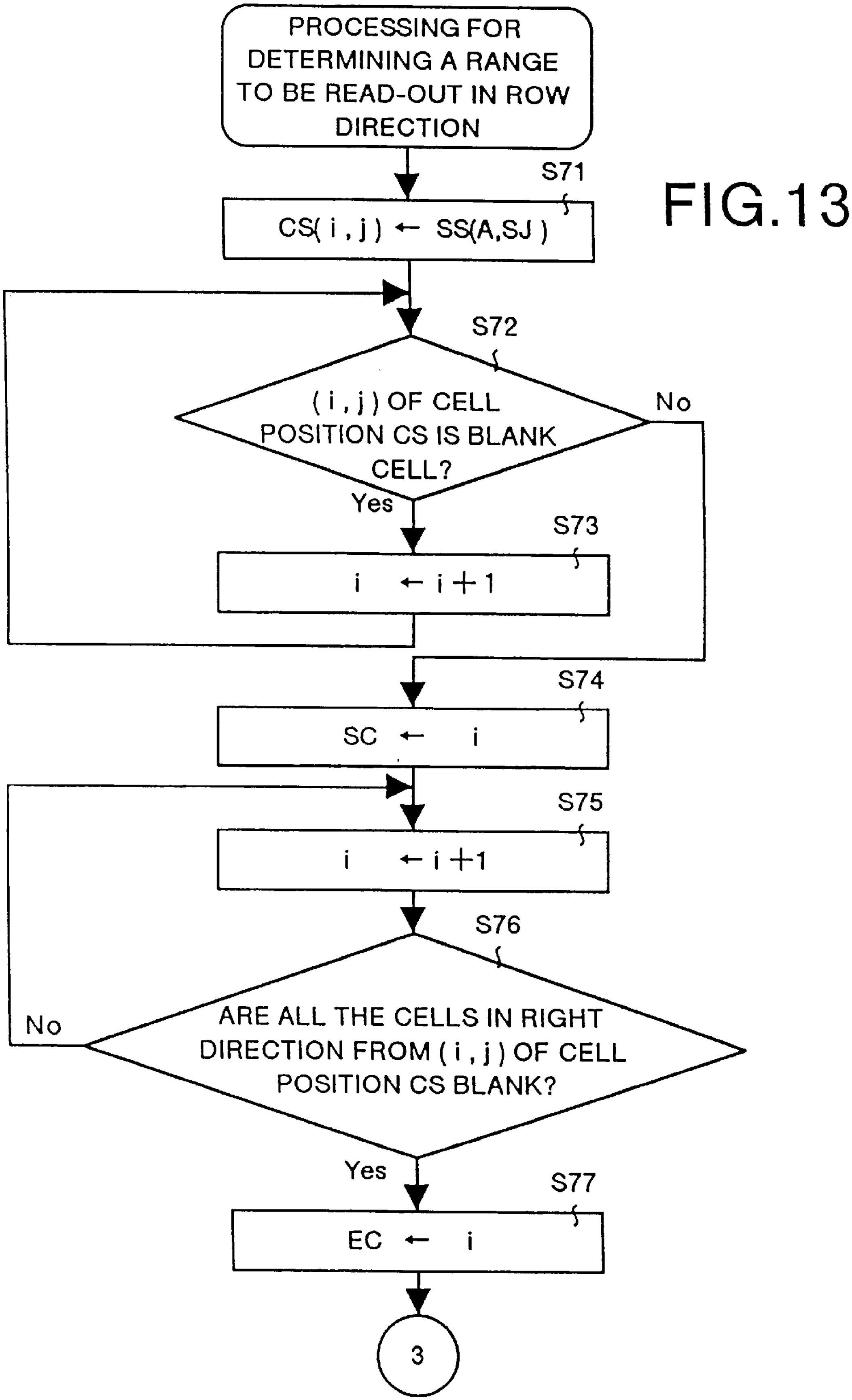
FIG. 13 is a flow chart for explaining the processing for determining a range to be read out in the row direction according to Embodiment 2.
Figure 14A:
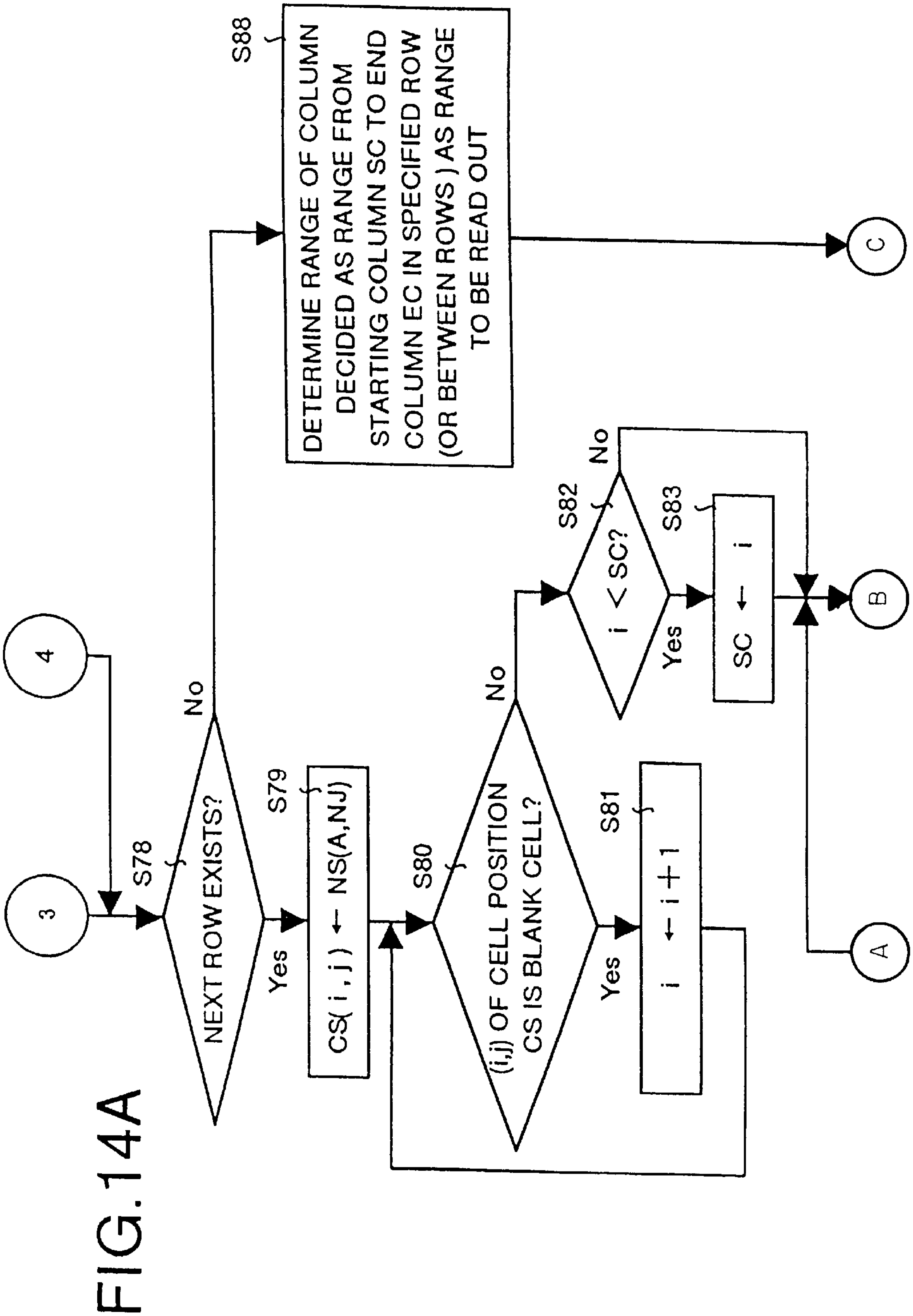
FIG. 14 is a flow chart for explaining the processing for determining a range to be read out in the row direction according to Embodiment 2.
Figure 14B:
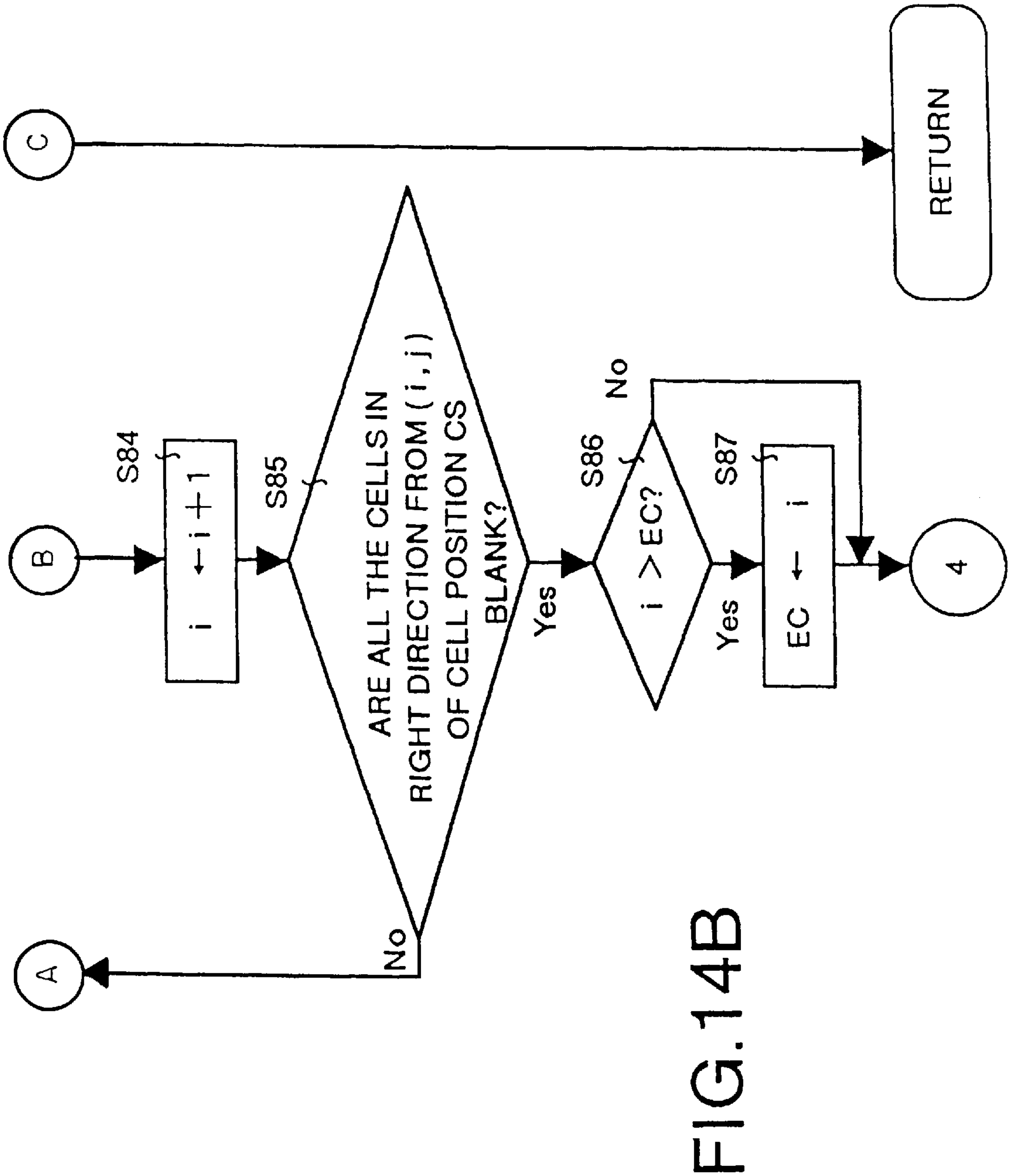
Figure 16:
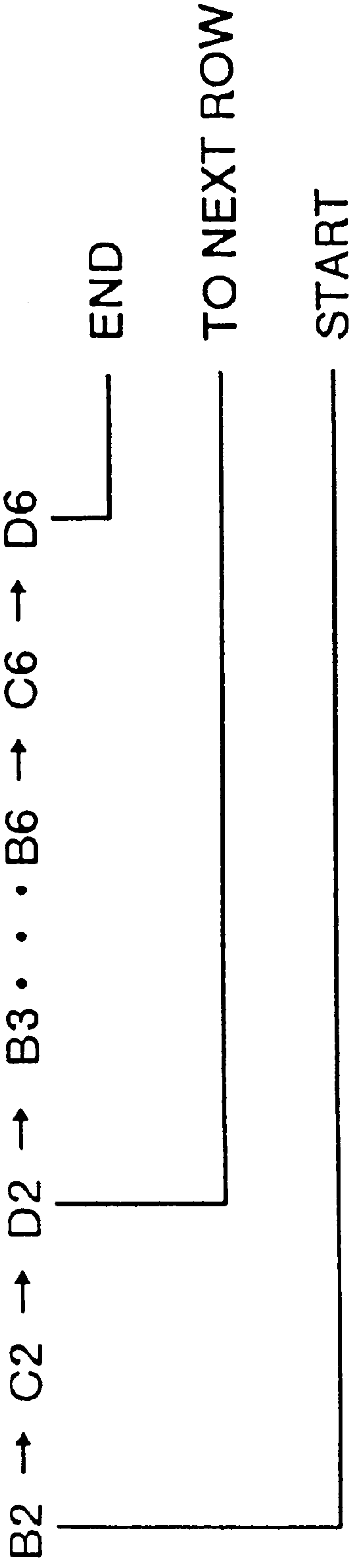
FIG. 16 is a view for explaining an example of the order of reading out the range to be read out in the row direction according to Embodiment 2.

In the next, description is made for operations, however, the main operations are the same as those in Embodiment 1, so that description is made hereinafter for determination on a range to be read out in a case where a direction to be read out is different such as the row direction and the column direction. Then, at first description is made for a case of the row direction. FIG. 13 and FIG. 14 are flow charts for explaining processing for determining a range to be read out in the row direction according to Embodiment 2, FIGS. 15A and 15B are views for explaining examples of determination of the range to be read out in the row direction according to Embodiment 2, and FIG. 16 is a view for explaining an example of the order of reading out the range to be read out in the row direction according to Embodiment 2.

In the processing according to Embodiment 2, the basic principle that the cell data is retrieved in accordance with a direction to be read out is the same as that in Embodiment 1, description is made hereinafter mainly for different sections therefrom. Herein, it is assumed that the direction to be read out is specified as a row direction by specifying a starting row and an end row in the column direction. At the time of specification, if only one row is the object to be specified, specification is made for only that row because the starting row and the end row are the same.

For example, as shown in FIG. 15A, in case the row number "2" (which is data for the parameter SL) is specified as the starting row and the row number "6" (which is data for the parameter EL) (positions of the row numbers for the specified rows are indicated by the shaded area in the figure) is specified as the end row, means that reading-out in the row direction from the second row up to the sixth row is specified. This specification is executed in step S1 in which the main processing is executed, and selection of the row itself can be executed by the existing technology, so that figures and concrete description thereof are omitted herein.

Assuming that a header cell position SS of the starting row is set to an address (A, SJ), at first the number of the starting row is put in SJ, then SJ is updated to "2". Accordingly, the address (A, 2) of the header cell position SS is given to the address (i, j) of the current cell position CS (step S71). Namely, the address of the current cell position CS is updated to the address (A, 2). Description is continued according to the example in FIGS. 15A and 15B thereafter.

Then, at first a starting column is obtained. The current cell position CS (A, 2) has no data therein, i.e. it is a blank cell (step S72), so that retrieval of cell data in the row direction namely in the rightward direction is continued as far as a cell having data therein is detected. Namely, the column number (parameter i) is successively incremented one by one in step S73, then determination is made in each column described above as to whether the cell at the current cell position CS is blank or not in step S72.

In this case, when the current cell position CS has moved to the C column, it is determined that data ("30" is displayed as cell data) exists therein (step S72), and in the above case the processing shifts to step S74. In step S74, as a column where a first cell having data is detected is decided as a starting column, the number of the column namely the column number "C" is set in the parameter SC indicating the starting column.

Then the end column is obtained. The column number (parameter i) is successively incremented one by one in step S75, then determination is made as to whether all the subsequent cells beyond the cell at the current cell position CS are blank or not in step S76.

In this case, when the current cell position CS has moved to the D column, it is determined that all the subsequent cells beyond the column D are blank (step S76), and in the above case the processing shifts to step S77. In step S77, as a column where the current cell position CS is present is decided as the end column, the number of the column namely the column number "D" is set in the parameter EC indicating the end column.

Then, in step S78, determination is made as to whether the next lower row to the starting row exists or not. However, retrieval as far as the sixth row which is the end row has not been ended in this stage, so it is resultantly determined that there is the next row. Accordingly, the processing shifts to step S79. Herein, assuming that the header cell position NS in the next row to the starting row is set to an address (A, NJ), the number of the next row to the starting row is put in NJ, then NJ is updated to "3". Accordingly, the address (A, 3) of the header cell position NS is given to the address (i, j) of the current cell position CS (step S71). Namely, the address of the current cell position CS is updated to the address (A, 3).

Then, at first a starting column in the third row is obtained. The current cell position CS (A, 3) has no data therein, i.e. it is a blank cell (step S80), so that retrieval of cell data in the row direction namely in the rightward direction is continued as far as a cell having data therein is detected. Namely, the column number (parameter i) is successively incremented one by one in step S81, then determination is made in each column described above as to whether the cell at the current cell position CS is blank or not in step S80.

In this case, when the current cell position CS has moved to the B column, it is determined that data ("111"" is displayed as cell data) exists therein (step S80), and in the above case the processing shifts to step S82. In step S82, from such determination that the column number "B" where the current cell position CS is present is a smaller number in ascending order than the column number "C" of the previously obtained starting column, the column number "B" is updated as a parameter SC indicating the starting column in the next step S83. It should be noted that, if it is determined that the starting column by the preset parameter SC is the prior column or the same column number as compared to the column where the current cell position is present, the processing shifts to step S84 as it is without updating of the parameter SC.

Then the end column is obtained. The column number (parameter i) is successively incremented one by one in step S84, then determination is made as to whether all the subsequent cells beyond the cell at the current cell position CS are blank or not in step S85.

In this case, when the current cell position CS has moved to the D column, it is determined that all the subsequent cells beyond the column D are blank (step S85), and in the above case the processing shifts to step S86. In step S86, the column where the current cell position CS is present is decided as the end column, however, as the number of the column namely the column number "D" is the same as the column number "D" of the previously obtained end column, the processing returns to step S78 as it is without updating of the parameter EC. It should be noted that, if it is determined in step S86 that the column number at the current cell position CS is a larger number in ascending order, the column number is updated as a parameter EC indicating the end column in step S87.

The same processing is successively executed for the fourth row, fifth row, and sixth row from the processing in step S78 and thereafter. It should be noted that, if it is determined that the column number at the current cell position CS is, as the fourth row and fifth row, the smaller number in ascending order in step S86, the parameter EC indicating the preset end column is not updated.

When the retrieval up to the sixth row is ended by the processing from step S78 to step S87 as described above, it is determined in step S78 that there is no next lower row therein, and the processing shifts to step S88. In step S88, a rectangular range formed with two points such as the starting cell position (SC, SL) and the end cell position (EC, EL) from the parameters SL, SC, EL, and EC each indicating the starting row, starting column, end row, and end column respectively is determined as a range to be read out. Namely, the range to be read out is the range indicated by the shaded area in FIG. 15B, and the range may highlighted on the display.

When the range to be read out is determined as described above, reading-out is executed in the main processing (refer to Step S5 in FIG. 3). Namely, the reading-out in the row direction is executed, as shown in FIG. 16, in the order of cells of B2 (indicating the cell position (B, 2)), C2, D2, B3, . . . , B6, C6, and D6. It should be noted that the read-out range memory 104 stores therein the range to be read out, when the range to be read out has been determined, in the order of reading-out shown in FIG. 16.

Figure 17:
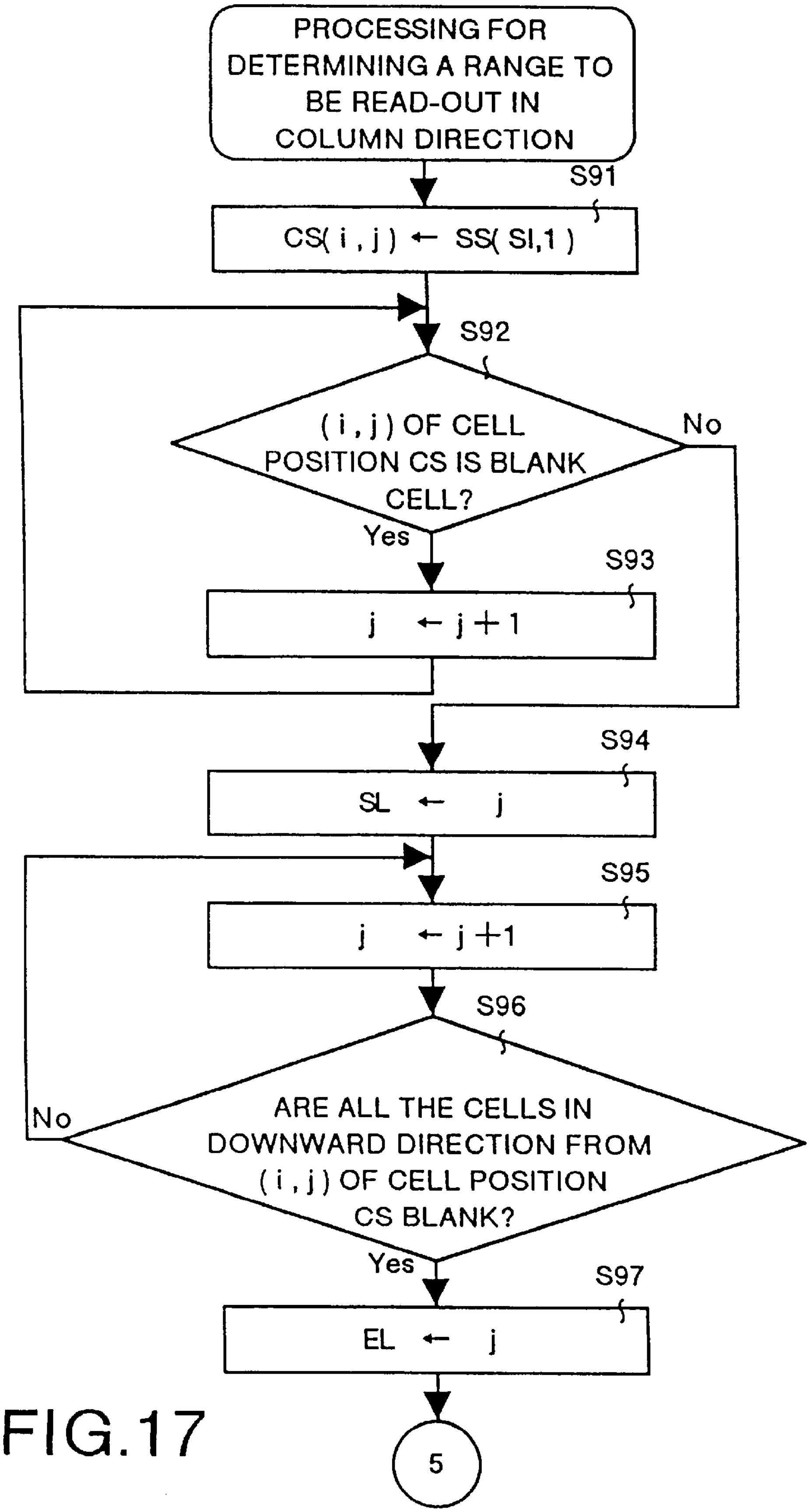
FIG. 17 is a flow chart for explaining the processing for determining a range to be read out in the column direction according to Embodiment 2.
Figure 18A:
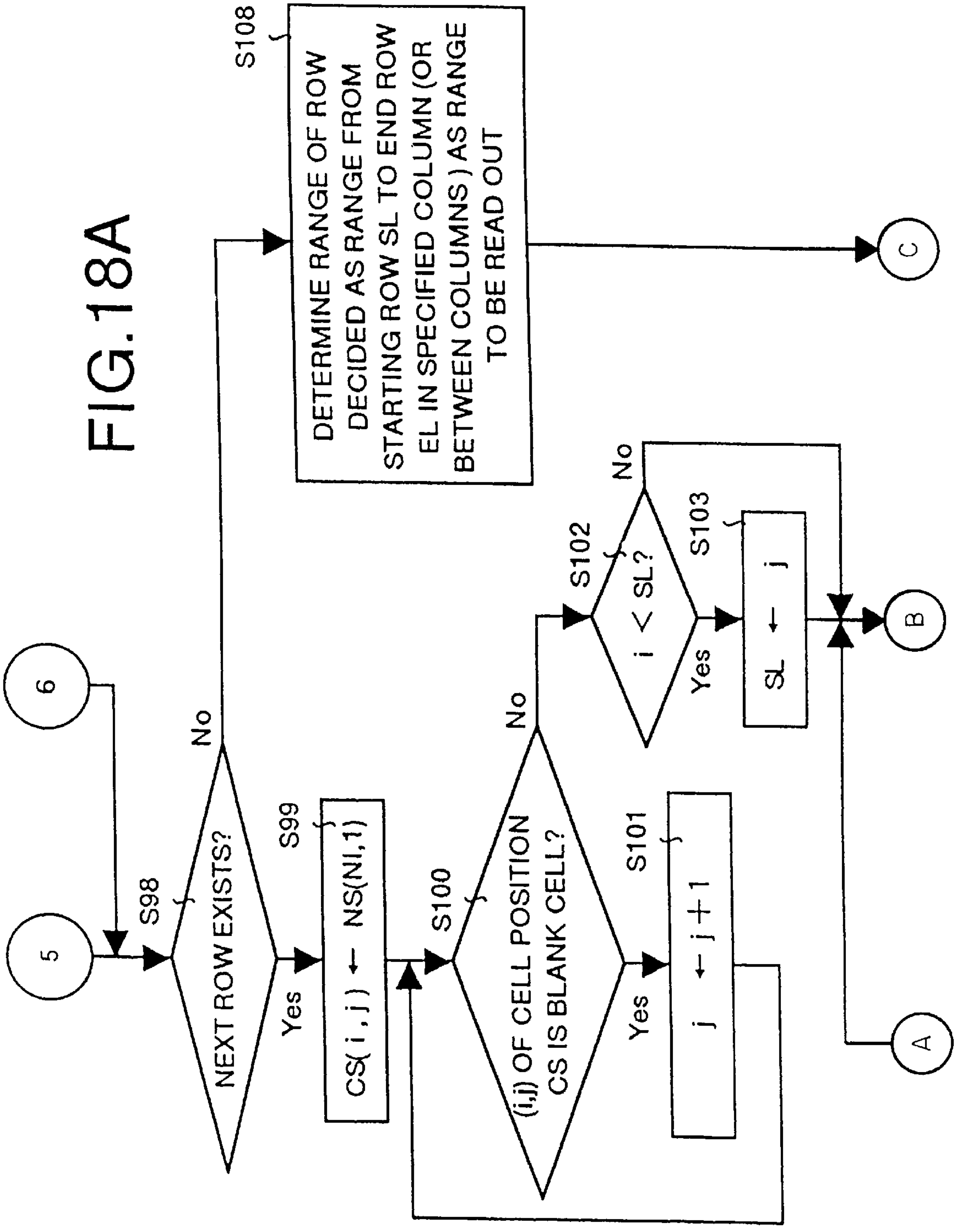
FIG. 18 is a flow chart for explaining the processing for determining a range to be read out in the column direction according to Embodiment 2.
Figure 18B:
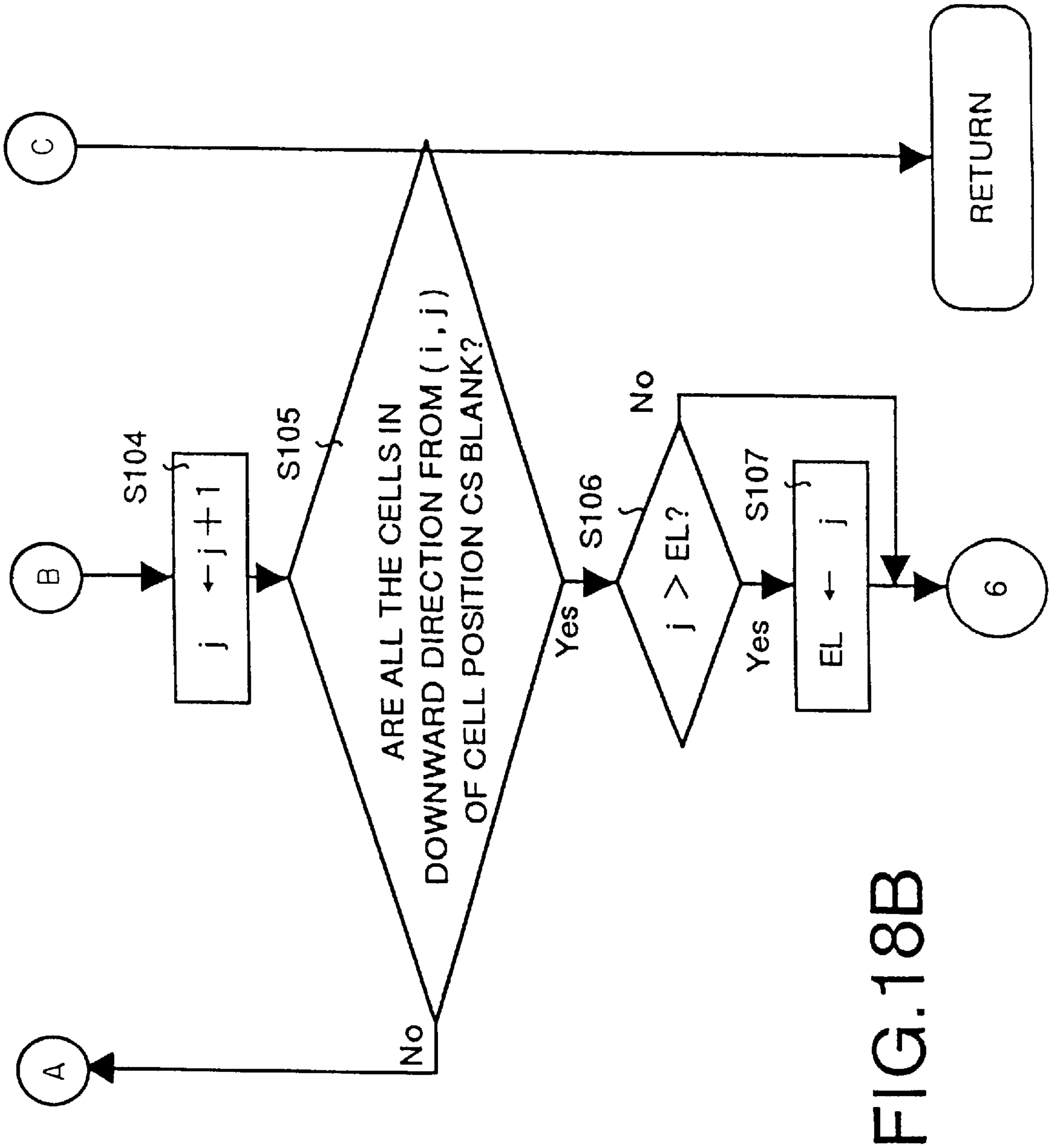
Figure 20:
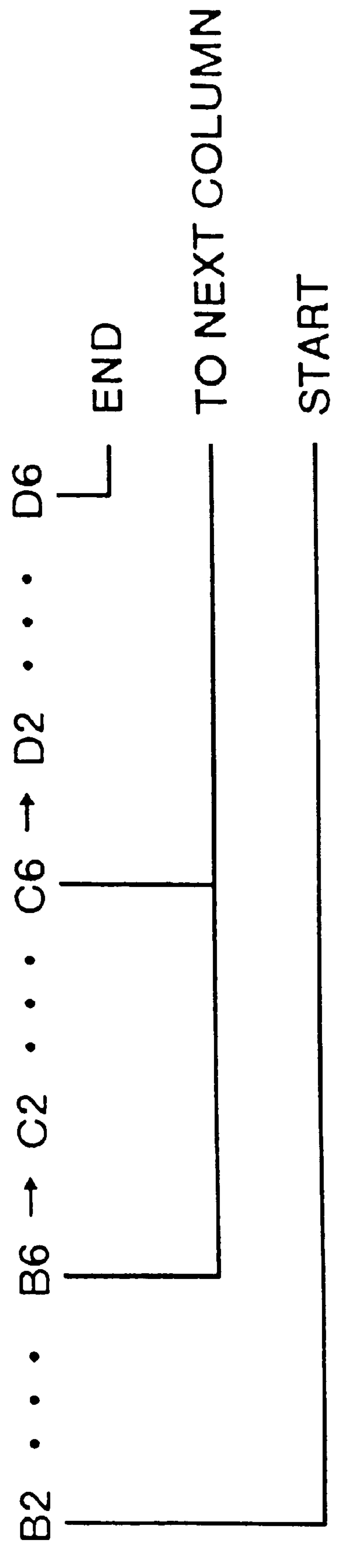
FIG. 20 is a view for explaining an example of the order of reading out the range to be read out in the column direction according to Embodiment 2.

In the next, description is made for a case of the column direction. In principle the case of the column direction is also the same as that of the row direction in the principle. FIG. 17 and FIG. 18 are flow charts for explaining processing for determining a range to be read out in the column direction according to Embodiment 2, FIGS. 19A and 19B are views for explaining examples of determination on the range to be read out in the column direction according to Embodiment 2, and FIG. 20 is a view for explaining an example of the order of reading out the range to be read out in the column direction according to Embodiment 2.

Herein, it is assumed that the direction to be read out is specified as a column direction by specifying a starting column and an end column in the row direction. At the time of specification, if only one column is the object to be specified, specification is made for only that column because the starting column and the end column are the same.

For example, as shown in FIG. 19A, in case the column number "B" (which is data for the parameter SC) is specified as the starting column and the column number "D" (which is data for the parameter EC) (positions of the column numbers for the specified columns are indicated by the shaded area in the figure) is specified as the end column, means that reading-out in the column direction from the B column up to the D column is specified. This specification is executed in step S1 in which the main processing is executed, and selection of the column itself can be executed by the existing technology, so that figures and concrete description thereof are omitted herein.

Assuming that a header cell position SS of the starting column is set to an address (SI, 1), at first the number of the starting column is put in SI, then SI is updated to "B". Accordingly, the address (B, 1) of the header cell position SS is given to the address (i, j) of the current cell position CS (step S91). Namely, the address of the current cell position CS is updated to the address (B, 1). Description is continued according to the example in FIGS. 19A and 19B thereafter.

Then, at first a starting row is obtained. The current cell position CS (B, 1) has no data therein, i.e. it is a blank cell (step S92), so that retrieval of cell data in the column direction namely in the downward direction is continued as far as a cell having data therein is detected. Namely, the row number (parameter j) is successively incremented one by one in step S93, then determination is made in each row described above as to whether the cell at the current cell position CS is blank or not in step S92.

In this case, when the current cell position CS has moved to the third row, it is determined that data ("111" is displayed as cell data) exists therein (step S92), and in the above case the processing shifts to step S94. In step S94, as a row where a first cell having data is detected is decided as a starting row, the number of the row namely the row number "3" is set in the parameter SL indicating the starting row.

Then the end row is obtained. The row number (parameter j) is successively incremented one by one in step S95, then determination is made as to whether all the subsequent cells beyond the cell where the current cell position CS is present are blank or not in step S96.

In this case, when the current cell position CS has moved to the fifth row, it is determined that all the subsequent cells beyond the fifth row are blank (step S96), and in the above case the processing shifts to step S97. In step S97, as the row where the current cell position CS is present is decided as the end row, the number of the row namely the row number "5" is set in the parameter EL indicating the end row.

Then, in step S98, determination is made as to whether a column next to the starting column exists or not. However, retrieval as far as the D column which is the end column has not been ended in this stage, so it is resultantly determined that there a the next column. Accordingly, the processing shifts to step S99. Herein, assuming that the header cell position NS in the next column to the starting column is set to an address (NI, 1), the number of the next column to the starting column is put in NI, then NI is updated to "C". Accordingly, the address (C, 1) of the header cell position NS is given to the address (i, j) of the current cell position CS. Namely, the address of the current cell position CS is updated to the address (C, 1).

Then, at first a starting row in the C column is obtained. The current cell position CS (C, 1) has no data therein, i.e. it is a blank cell (step S100), so that retrieval of cell data in the column direction namely in the downward direction is continued as far as a cell having data therein is detected. Namely, the row number (parameter j) is successively incremented one by one in step S101, then determination is made in each row described above as to whether the cell at the current cell position CS is blank or not in step S100.

In this case, when the current cell position CS has moved to the second row, it is determined that data ("30" is displayed as cell data) exists therein (step S100), and in the above case the processing shifts to step S102. In step S102, from such determination that the column number "2" where the current cell position CS is present is a smaller number in ascending order than the row number "3" of the previously obtained starting row, the row number "2" is updated as a parameter SL indicating the starting row in the next step S103. It should be noted that, if it is determined that the starting row by the preset parameter SL is the prior row or the same row number as compared to the row where the current cell position is present, the processing shifts to step S104 as it is without updating of the parameter SL.

Then the end row is obtained. The row number (parameter j) is successively incremented one by one in step S104, then determination is made as to whether all the subsequent cells beyond the cell at the current cell position CS are blank or not in step S105.

In this case, when the current cell position CS has moved to the sixth row, it is determined that all the subsequent cells beyond the sixth row are blank (step S105), and in the above case the processing shifts to step S106. In step S106, the row where the current cell position CS is present is decided as the end row, however, as the number of the row namely the row number "6" is a larger number in ascending order than the row number "5" of the previously obtained end row, the processing returns to step S98 after the parameter EL has been updated to the row number "6". It should be noted that, if it is determined in step S106 that the row number at the current cell position CS is a smaller number in ascending order or the same number, the processing returns to step S98 without updating of the parameter EL.

The same processing is successively executed for the D column in the next row from the processing in step S98. It should be noted that, if it is determined that the row number at the current cell position CS is, as the D column, the same number as the preset end row in ascending order in step S106, the parameter EL indicating the preset end row is not updated.

When the retrieval up to the D column is ended by the processing from step S98 to step S107 as described above, it is determined in step S98 that there is no next column therein, and the processing shifts to step S108. In step S108, a rectangular range formed with two points such as the starting cell position (SC, SL) and the end cell position (EC, EL) from the parameters SL, SC, EL, and EC each indicating the starting row, starting column, end row, and end column respectively is determined as a range to be read out. Namely, the range to be read out is the range indicated by the shaded area in FIG. 19B, and the range may be highlighted on the display or the like.

When the range to be read out is determined as described above, reading-out is executed in the main processing (refer to Step S5 in FIG. 3). Namely, the reading-out in the column direction is executed, as shown in FIG. 20, in the order of cells of B2 (indicating the cell position (B, 2)) . . . B6, C2 . . . C6, D2 . . . D6. It should be noted that the read-out range memory 104 stores therein the range to be read out, when the range to be read out has been determined, in the order of reading-out shown in FIG. 20.

As described above, with Embodiment 2, when a spread sheet is to be read out along the row direction, an object to be read out is specified in the spread sheet with a starting row as well as with an end row each to be read out; within a range from the starting row to the end row, for the row direction, a range up to a cell beyond which all the subsequent cells in the column direction are blank is retrieved; and the range formed with the range in the row direction and with the range from the starting row to the end row is determined as a range to be read out, so that only the starting row and the end row each to be read out may be specified without necessity of specifying the whole range to be read out required when the range is to be read along the row direction, and with this feature operations to specify a range to be read out can be simplified at the time of reading it out along the row direction, whereby it is possible to reduce a load on a user.

Also, when a spread sheet to be read out along the column direction, an object to be read out is specified in the spread sheet with a starting column as well as with an end column each to be read out; within a range from the starting column to the end column, for the column direction, a range up to a cell beyond which all the subsequent cells in the row direction are blank is retrieved; and the range formed with the range in the column direction and with the range from the starting column to the end column is determined as a range to be read out, so that only the starting column and the end column each to be read out may be specified without necessity of specifying the whole range to be read out required when the range is to be read out along the column direction, and with this feature operations to specify a range to be read out can be simplified at the time of reading it out along the column direction, whereby it is possible to reduce a load on a user.

As the cells within the determined range to be read out are read out along the preset direction to be read out, whereby it is possible to realize a desired reading-out/collation of the cells only by specifying a range to be read out with simple operations.

Embodiment 3

In Embodiment 2, a range to be read out is obtained from a range between a starting row and an end row or a range between a starting column and an end column by specifying the starting row and end row or the starting column and end column, however, as is Embodiment 3 described below, only one or a plurality of rows or columns each actually desired to be read out are specified as an object to be read out without specifying of a starting row, an end row, a starting column, and an end column, then only the specified row(s) or column(s) may be read out.

Figures 22, 23:
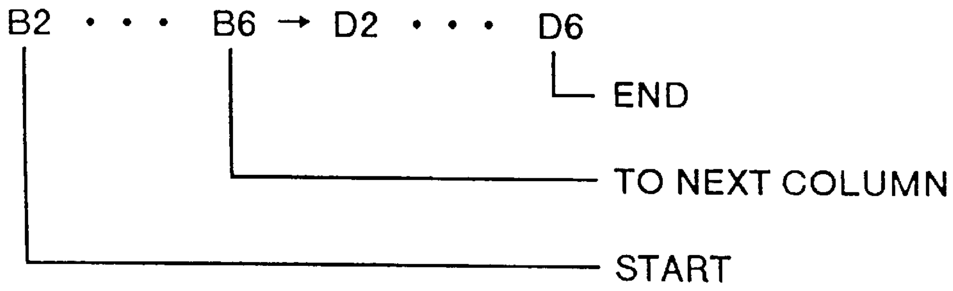
FIG. 22 is a view for explaining an example of the order of reading out the range to be read out in the column direction according to Embodiment 3.
FIG. 23 is a view for explaining a method of specifying a range to be read out according to the example based on the conventional technology.

In Embodiment 3, the configuration herein is the same as that in Embodiment 2, so that description thereof is omitted herein. Description is made hereinafter only for the different points of the operations therefrom and examples of determination on the range to be read out according to the operations. FIGS. 21A and 21B are views for explaining examples of determination of the range to be read out in the column direction according to Embodiment 3, and FIG. 22 is a view for explaining an example of the order of reading out the range to be read out in the column direction according to Embodiment 3.

In Embodiment 2 as described above, in the determination of the range to be read out in the row direction, as shown in the flow chart in FIG. 14, all the cells in each row between the starting row and the end row are scanned while it is determined that the next row is present in step S78, on the other hand, in the determination of the range to be read out in the column direction, as shown in the flow chart in FIG. 18, all the cells in each column between the starting column and the end column are scanned while it is determined that the next column is present in step S98.

In contrast, in Embodiment 3, cells only in the specified row(s) or column(s) are scanned, so that the next row and the next column corresponding to those in step S78 and in step S98 are the row and column which have previously been specified. The row specified as described above may be one row, a plurality of rows adjacent to each other, or a plurality of rows apart from each other. Also, the column specified as described above may be one column, a plurality of columns adjacent to each other, or a plurality of columns apart from each other.

Herein the spread sheet having the same cell data as that in the spread sheet shown in FIG. 19A is taken up as an example (refer to FIG. 21A). In a case where the B column and D column are specified to read out the table in the column direction, the range to be read out is the range indicated by the shaded area in FIG. 21B, and as in Embodiment 2, the range may be shown to a user by being displayed in reverse video on the display or the like.

When the range to be read out is determined as described above, reading-out is executed in the main processing (refer to Step S5 in FIG. 3). Namely, the reading-out in the column direction is executed, as shown in FIG. 22, in the order of cells of B2 (indicating the cell position (B, 2)) . . . B6, D2 . . . D6. It should be noted that the read-out range memory 104 stores therein the range to be read out, when the range to be read out has been determined, in the order of reading-out shown in FIG. 22. In the above description, reading-out in the column direction has been taken up as an example, and as the same processing is executed also for reading-out in the row direction, description thereof is omitted herein.

As described above, with Embodiment 3, when a spread sheet is to be read out in the row direction, only one or a plurality of rows each of which is targeted as an object to be read out are specified in the spread sheet; within a range of the specified row(s), for the row direction, a range up to a cell beyond which all the subsequent cells in the column direction are blank is retrieved; and the range formed with the range in the row direction and with the row(s) is determined as a range to be read out, so that only each row may be specified for a range to be read out when the range is to be read out along the row direction, and with this feature operations to specify a range to be read out can be simplified at the time of reading it out along the row direction, whereby it is possible to reduce a load on a user.

With the present invention, when a spread sheet is to be read out along the column direction, only one or a plurality of columns each of which is targeted as an object to be read out are specified in the spread sheet; within a range of the specified column(s), for the column direction, a range up to a cell beyond which all the subsequent cells in the row direction are blank is retrieved; and the range formed with the range in the column direction and with the column(s) is determined as a range to be read out, so that only each column may be specified for a range to be read out when the range is to be read out along the column direction, and with this feature operations to specify a range to be read out can be simplified at the time of reading it out along the column direction, whereby it is possible to reduce a load on a user.

To discriminate between a blank cell within a range to be read out and that without the range to be read out, an effective sound or the like may be inserted in the table when the blank cell within the range to be read out is read out so that a position of the blank cell may be expressed by sound, which is shared with Embodiment 1, Embodiment 2, and Embodiment 3. In this case, the voice-generating data generation module 5 generates voice-generating data for a blank cell according to cell data supplied from the spread sheet preparation module 1. As described above, an effective sound for a blank cell phonetically outputted from the voice synthesis module 6 corresponds to reading-out for one cell, whereby it is possible to prevent displacement between a document and a sound at the time of reading-out/collation.

As described above, with the present invention, a header cell to be read out in the spread sheet is set; within a range formed with cells to be read out following the header cell, for a main scanning direction along a preset direction to be read out, a range up to a cell beyond which all the subsequent cells in an auxiliary scanning direction crossing the main scanning direction are blank and, for the auxiliary scanning direction crossing the main scanning direction along the preset direction to be read out, a range up to a cell beyond which all the subsequent cells in the main scanning direction crossing the auxiliary scanning direction are blank are retrieved; and the range formed with the range in the main scanning direction and with the range in the auxiliary scanning direction is determined as a range to be read out, so that only the header cell to be read out may be specified without necessity of specifying the whole range to be read out, and with this feature operations to specify a range to be read out can be simplified, whereby it is possible to obtain a spread sheet reading-out/collating apparatus enabling reduction of a load on a user.

With this invention, when a spread sheet is to be read out along the row direction, a header cell to be read out is specified in the spread sheet; within a range formed with cells to be read out following the header cell, for the row direction, a range up to a cell beyond which all the subsequent cells in the column direction are blank and, for the column direction, a range up to a cell beyond which all the subsequent cells in the row direction are blank are retrieved; and the range formed with the range in the row direction and with the range in the column direction is determined as a range to be read out, so that only the header cell to be read out may be specified without necessity of specifying the whole range to be read out required when the range is to be read out along the row direction, and with this feature operations to specify a range to be read out can be simplified at the time of reading it out along the row direction, whereby it is possible to obtain a spread sheet reading-out/collating apparatus enabling reduction of a load on a user.

With this invention, when a spread sheet is to be read out along the column direction, a header cell to be read out is specified in the spread sheet; within a range formed with cells to be read out following the header cell, for the column direction, a range up to a cell beyond which all the subsequent cells in the row direction are blank and, for the row direction, a range up to a cell beyond which all the subsequent cells in the column direction are blank are retrieved; and the range formed with the range in the column direction and with the range in the row direction is determined as a range to be read out, so that only the header cell to be read out may be specified without necessity of specifying the whole range to be read out required when the range is to be read out along the column direction, and with this feature operations to specify a range to be read out can be simplified at the time of reading it out along the column direction, whereby it is possible to obtain a spread sheet reading-out/collating apparatus enabling reduction of a load on a user.

With this invention, cells are arrayed along the preset direction to be read and an object to be read out is specified in the spread sheet with an alignment of the header cell and with an alignment of the last cell having a space therebetween in a direction crossing the preset direction to be read out; within a range from the alignment of the header cell to the alignment of the last cell, for the preset direction to be read out, a range up to a cell beyond which all the subsequent cells arrayed in a direction crossing the direction to be read out are blank is retrieved; and the range formed with the range in the preset direction to be read out and with the range from the alignment of the header cell to the alignment of the last cell is determined as a range to be read out, so that only the alignment of the header cell and the alignment of the last cell each to be read out may be specified without necessity of specifying the whole range to be read out required when the range is to be read, and with this feature operations to specify a range to be read out can be simplified, whereby it is possible to obtain a spread sheet reading-out/collating apparatus enabling reduction of a load on a user.

With this invention, when a spread sheet is to be read out along the row direction, an object to be read out is specified in the spread sheet with a starting row as well as with an end row each to be read out; within a range from the starting row to the end row, for the row direction, a range up to a cell beyond which all the subsequent cells in the column direction are blank is retrieved; and the range formed with the range in the row direction and with the range from the starting row to the end row is determined as a range to be read out, so that only the starting row and the end row each to be read out may be specified without necessity of specifying the whole range to be read out required when the range is to be read along the row direction, and with this feature operations to specify a range to be read out can be simplified at the time of reading it out along the row direction, whereby it is possible to obtain a spread sheet reading-out/collating apparatus enabling reduction of a load on a user.

With this invention, when a spread sheet to be read out along the column direction, an object to be read out is specified in the spread sheet with a starting column as well as with an end column each to be read out; within a range from the starting column to the end column, for the column direction, a range up to a cell beyond which all the subsequent cells in the row direction are blank is retrieved; and the range formed with the range in the column direction and with the range from the starting column to the end column is determined as a range to be read out, so that only the starting column and the end column each to be read out may be specified without necessity of specifying the whole range to be read out required when the range is to be read along the column direction, and with this feature operations to specify a range to be read out can be simplified at the time of reading it out along the column direction, whereby it is possible to obtain a spread sheet reading-out/collating apparatus enabling reduction of a load on a user.

With this invention, when a spread sheet is to be read out in the row direction, only one or a plurality of rows each of which is targeted as an object to be read out are specified in the spread sheet; within a range of the specified row(s), for the row direction, a range up to a cell beyond which all the subsequent cells in the column direction are blank is direction and with the row(s) is determined as a range to be read out, so that only rows may be specified for a range to be read out required when the range is to be read out along the row direction, and with this feature operations to specify a range to be read out can be simplified at the time of reading it out along the row direction, whereby it is possible to obtain a spread sheet reading-out/collating apparatus enabling reduction of a load on a user.

With this invention, when a spread sheet is to be read out along the column direction, only one or a plurality of columns each of which is targeted as an object to be read out are specified in the spread sheet; within a range of the specified column(s), for the column direction, a range up to a cell beyond which all the subsequent cells in the row direction are blank is retrieved; and the range formed with the range in the column direction and with the column(s) is determined as a range to be read out, so that only columns may be specified for a range to be read out required when the range is to be read out along the column direction, and with this feature operations to specify a range to be read out can be simplified at the time of reading it out along the column direction, whereby it is possible to obtain a spread sheet reading-out/collating apparatus enabling reduction of a load on a user.

With this invention, the cells within the determined range to be read out are read out along the preset direction to be read out, whereby it is possible to obtain a spread sheet reading-out/collating apparatus enabling realization of a desired reading-out/collation only by specifying a range to be read out with simple operations.

With this invention, a header cell to be read out is specified in the spread sheet; within a range formed with cells to be read out following the header cell, for a main scanning direction along a preset direction to be read out, a range up to a cell beyond which all the subsequent cells in an auxiliary scanning direction crossing the main scanning direction are blank and, for the auxiliary scanning direction crossing the main scanning direction along the preset direction to be read out, a range up to a cell beyond which all the subsequent cells in the main scanning direction crossing the auxiliary scanning direction are blank are retrieved; the range formed with the range in the main scanning direction and with the range in the auxiliary scanning direction is determined as a range to be read out; and the cells within the range to be read out are read out along the preset direction to be read out, so that only a header cell to be read out may be specified without necessity of specifying the whole range to be read out, whereby it is possible to obtain a spread sheet reading-out/collating method enabling realization of reading-out/collating a desired range to be read out with simple operations.

With this invention, cells are arrayed along the preset direction to be read and an object to be read out in the spread sheet is specified with an alignment of the header cell as well as with an alignment of the last cell having a space therebetween in a direction crossing the preset direction to be read out; within a range from the alignment of the header cell to the alignment of the last cell, for the preset direction to be read out, a range up to a cell beyond which all the subsequent cells arrayed in a direction crossing the direction to be read out are blank is retrieved; the range formed with the range in the preset direction to be read out and with the range from the alignment of the header cell to the alignment of the last cell is determined as a range to be read out; and the cells within the range to be read out are read out along the preset direction to be read out, so that only an alignment of a header cell and an alignment of a last cell each to be read out may be specified without necessity of specifying the whole range required when the range is read out, whereby it is possible to obtain a spread sheet reading-out/collating method enabling realization of reading-out/collating a desired range to be read out with simple operations.

With this invention, a program for making a computer execute the method according to the present invention, so that the program becomes machine-readable, whereby it is possible to obtain a recording medium enabling realization of the operations according to the invention by a computer.

This application is based on Japanese patent application No. HEI 9-118521 filed in the Japanese Patent Office on May 8, 1997, the entire contents of which are hereby incorporated by reference.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A spread sheet reading-out/collating apparatus for reading out a spread sheet with a plurality of cells for inputting data for expressing a character string thereto arrayed in rows and columns comprising:

a specifying module for specifying a header cell to be read out in said spread sheet;

a retrieving module for retrieving, within a range formed with cells to be read out following the header cell specified by said specifying module, for a main scanning direction along a preset direction to be read out, a range up to a cell beyond which all the subsequent cells in an auxiliary scanning direction crossing the main scanning direction are blank, and, for the auxiliary scanning direction crossing the main scanning direction along said preset direction to be read out, a range up to a cell beyond which all the subsequent cells in the main scanning direction crossing the auxiliary scanning direction are blank; and a determining module for determining the range formed with the range in the main scanning direction and with the range in the auxiliary scanning direction each obtained by the retrieval by said retrieving module as a range to be read out.

2. A spread sheet reading-out/collating apparatus according to claim 1 comprising:

a phonetically reading-out module for reading out the data in the cells within the range to be read out determined by said determining module along the preset direction to be read out.

3. A spread sheet reading-out/collating apparatus for reading out a spread sheet with a plurality of cells for inputting data for expressing a character string thereto arrayed in rows and columns along the row direction as a preset direction to be read out; said apparatus comprising:

a specifying module for specifying a header cell to be read out in said spread sheet;

a retrieving module for retrieving, within a range formed with cells to be read out following the header cell specified by said specifying module, for the row direction, a range up to a cell beyond which all the subsequent cells in the column direction are blank, and, for the column direction, a range up to a cell beyond which all the subsequent cells in the row direction are blank; and a determining module for determining the range formed with the range in the row direction and with the range in the column direction each obtained by the retrieval by said retrieving module as a range to be read out.

4. A spread sheet reading-out/collating apparatus according to claim 3 comprising:

a phonetically reading-out module for reading out the data in the cells within the range to be read out determined by said determining module along the preset direction to be read out.

5. A spread sheet reading-out/collating apparatus for reading out a spread sheet with a plurality of cells for inputting data for expressing a character string thereto arrayed in rows and columns along the column direction as a preset direction to be read out; said apparatus comprising:

a specifying module for specifying a header cell to be read out in said spread sheet;

a retrieving module for retrieving, within a range formed with cells to be read out following the header cell specified by said specifying module, for the column direction, a range up to a cell beyond which all the subsequent cells in the row direction are blank, and, for the row direction, a range up to a cell beyond which all the subsequent cells in the column direction are blank; and a determining module for determining the range formed with the range in the column direction and with the range in the row direction each obtained by the retrieval by said retrieving module as a range to be read out.

6. A spread sheet reading-out/collating apparatus according to claim 5 comprising:

a phonetically reading-out module for reading out the data in the cells within the range to be read out determined by said determining module along the preset direction to be read out.

7. A spread sheet reading-out/collating apparatus for reading out a spread sheet with a plurality of cells for inputting data for expressing a character string thereto arrayed in rows and columns comprising:

a specifying module for arranging cells along the preset direction to be read and specifying an object to be read out in said spread sheet with an alignment of the header cell and with an alignment of the last cell having a space therebetween in a direction crossing said preset direction to be read out;

a retrieving module for retrieving, within a range from the alignment of the header cell to the alignment of the last cell each specified by said specifying module, for the preset direction to be read out, a range up to a cell beyond which all the subsequent cells arrayed in a direction crossing the direction to be read out are blank; and a determining module for determining the range formed with the range in said preset direction to be read out obtained by the retrieval by said retrieving module and with the range from the alignment of the header cell to the alignment of the last cell each specified by said specifying module as a range to be read out.

8. A spread sheet reading-out/collating apparatus according to claim 7 comprising:

a phonetically reading-out module for reading out the data in the cells within the range to be read out determined by said determining module along the preset direction to be read out.

9. A spread sheet reading-out/collating apparatus for reading out a spread sheet with a plurality of cells for inputting data for expressing a character string thereto arrayed in rows and columns along the row direction as a preset direction to be read out; said apparatus comprising:

a specifying module for specifying an object to be read out in said spread sheet with a header row as well as with a last row each to be read out;

a retrieving module for retrieving, within a range from the header row to the last row each specified by said specifying module, for the row direction, a range up to a cell beyond which all the subsequent cells in the column direction are blank; and a determining module for determining the range formed with the range in the row direction obtained by the retrieval by said retrieving module and with the range from the header row to the last row each specified by said specifying module as a range to be read out.

10. A spread sheet reading-out/collating apparatus according to claim 9 comprising:

a phonetically reading-out module for reading out the data in the cells within the range to be read out determined by said determining module along the preset direction to be read out.

11. A spread sheet reading-out/collating apparatus for reading out a spread sheet with a plurality of cells for inputting data for expressing a character string thereto arrayed in rows and columns along the column direction as a preset direction to be read out; said apparatus comprising:

a specifying module for specifying an object to be read out in said spread sheet with a header column as well as with a last column each to be read out;

a retrieving module for retrieving, within a range from the header column to the last column each specified by said specifying module, for the column direction, a range up to a cell beyond which all the subsequent cells in the row direction are blank; and a determining module for determining the range formed with the range in the column direction obtained by the retrieval by said retrieving module and with the range from the header column to the last column each specified by said specifying module as a range to be read out.

12. A spread sheet reading-out/collating apparatus according to claim 11 comprising:

a phonetically reading-out module for reading out the data in the cells within the range to be read out determined by said determining module along the preset direction to be read out.

13. A spread sheet reading-out/collating apparatus for reading out a spread sheet with a plurality of cells for inputting data for expressing a character string thereto arrayed in rows and columns along the row direction as a preset direction to be read out; said apparatus comprising:

a specifying module for specifying an object to be read out in said spread sheet with one or a plurality of rows;

a retrieving module for retrieving, within a range of one or a plurality of rows specified by said specifying module, for the row direction, a range up to a cell beyond which all the subsequent cells in the column direction are blank; and a determining module for determining the range formed with the range in the row direction obtained by the retrieval by said retrieving module and with the row(s) specified by said specifying module as a range to be read out.

14. A spread sheet reading-out/collating apparatus according to claim 13 comprising:

a phonetically reading-out module for reading out the data in the cells within the range to be read out determined by said determining module along the preset direction to be read out.

15. A spread sheet reading-out/collating apparatus for reading out a spread sheet with a plurality of cells for inputting data for expressing a character string thereto arrayed in rows and columns along the column direction as a preset direction to be read out; said apparatus comprising:

a specifying module for specifying an object to be read out in said spread sheet with one or a plurality of columns;

a retrieving module for retrieving, within a range of one or a plurality of columns specified by said specifying module, for the column direction, a range up to a cell beyond which all the subsequent cells in the row direction are blank; and a determining module for determining the range formed with the range in the column direction obtained by the retrieval by said retrieving module and with the column (s) specified by said specifying module as a range to be read out.

16. A spread sheet reading-out/collating apparatus according to claim 15 comprising:

a phonetically reading-out module for reading out the data in the cells within the range to be read out determined by said determining module along the preset direction to be read out.

17. A spread sheet reading-out/collating method for reading out a spread sheet with a plurality of cells for inputting data for expressing a character string thereto arrayed in rows and columns comprising:

a specifying step of specifying a header cell to be read out in said spread sheet;

a retrieving step of retrieving, within a range formed with cells to be read out following the header cell specified in said specifying step, for a main scanning direction along a preset direction to be read out, a range up to a cell beyond which all the subsequent cells in an auxiliary scanning direction crossing the main scanning direction are blank, and, for the auxiliary scanning direction crossing the main scanning direction along said preset direction to be read out, a range up to a cell beyond which all the subsequent cells in the main scanning direction crossing the auxiliary scanning direction are blank;

a determining step of determining the range formed with the range in the main scanning direction and with the range in the auxiliary scanning direction each obtained by the retrieval in said retrieving step as a range to be read out; and a phonetically reading-out step of reading out the cells within the range to be read out determined in said determining step along the preset direction to be read out.

18. A spread sheet reading-out/collating method for reading out a spread sheet with a plurality of cells for inputting data for expressing a character string thereto arrayed in rows and columns comprising:

a specifying step of arranging cells along the preset direction to be read and specifying an object to be read out in said spread sheet with an alignment of the header cell as well as with an alignment of the last cell having a space therebetween in a direction crossing said preset direction to be read out;

a retrieving step of retrieving, within a range from the alignment of the header cell to the alignment of the last cell each specified in said specifying step, for the preset direction to be read out, a range up to a cell beyond which all the subsequent cells arrayed in a direction crossing the direction to be read out are blank;

a determining step of determining the range formed with the range in said preset direction to be read out obtained by the retrieval in said retrieving step and with the range from the alignment of the header cell to the alignment of the last cell each specified in said specifying step as a range to be read out; and a phonetically reading-out step of reading out the cells within the range to be read out determined in said determining step along the preset direction to be read out.

19. A computer-readable recording medium with a program stored therein for making a computer execute a spread sheet reading-out/collating method for reading out a spread sheet with a plurality of cells for inputting data for expressing a character string thereto arrayed in rows and columns according to the following steps:

a specifying step of specifying a header cell to be read out in said spread sheet;

a retrieving step of retrieving, within a range formed with cells to be read out following the header cell specified in said specifying step, for a main scanning direction along a preset direction to be read out, a range up to a cell beyond which all the subsequent cells in an auxiliary scanning direction crossing the main scanning direction are blank, and, for the auxiliary scanning direction crossing the main scanning direction along said preset direction to be read out, a range up to a cell beyond which all the subsequent cells in the main scanning direction crossing the auxiliary scanning direction are blank;

a determining step of determining the range formed with the range in the main scanning direction and with the range in the auxiliary scanning direction each obtained by the retrieval in said retrieving step as a range to be read out; and a phonetically reading-out step of reading out the cells within the range to be read out determined in said determining step along the preset direction to be read out.

20. A computer-readable recording medium with a program stored therein for making a computer execute a spread sheet reading-out/collating method for reading out a spread sheet with a plurality of cells for inputting data for expressing a character string thereto arrayed in rows and columns according to the following steps:

a specifying step of arranging cells along the preset direction to be read and specifying an object to be read out in said spread sheet with an alignment of the header cell as well as with an alignment of the last cell having a space therebetween in a direction crossing said preset direction to be read out;

a retrieving step of retrieving, within a range from the alignment of the header cell to the alignment of the last cell each specified in said specifying step, for the preset direction to be read out, a range up to a cell beyond which all the subsequent cells arrayed in a direction crossing the direction to be read out are blank;

a determining step of determining the range formed with the range in said preset direction to be read out obtained by the retrieval in said retrieving step and with the range from the alignment of the header cell to the alignment of the last cell each specified in said specifying step as a range to be read out; and a phonetically reading-out step of reading out the cells within the range to be read out determined in said determining step along the preset direction to be read out.

* * * * *